US012167504B2

(12) United States Patent
Dong et al.

(10) Patent No.: US 12,167,504 B2
(45) Date of Patent: Dec. 10, 2024

(54) DYNAMIC PACKET DUPLICATION CONVERGENCE PROTOCOL CONFIGURATION

(71) Applicant: ZTE CORPORATION, Guangdong (CN)

(72) Inventors: Fei Dong, Shenzhen (CN); He Huang, Shenzhen (CN); Xiaojuan Shi, Shenzhen (CN); Zhuang Liu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 522 days.

(21) Appl. No.: 17/383,552

(22) Filed: Jul. 23, 2021

(65) Prior Publication Data

US 2021/0352762 A1 Nov. 11, 2021

Related U.S. Application Data

(63) Continuation of application No. PCT/CN2019/073375, filed on Jan. 28, 2019.

(51) Int. Cl.
*H04W 80/02* (2009.01)
*H04W 76/15* (2018.01)
(52) U.S. Cl.
CPC ............ *H04W 80/02* (2013.01); *H04W 76/15* (2018.02)
(58) Field of Classification Search
None
See application file for complete search history.

(56) References Cited

U.S. PATENT DOCUMENTS

| 2018/0368107 | A1 | 12/2018 | Babaei et al. | |
|---|---|---|---|---|
| 2019/0082363 | A1* | 3/2019 | Park | H04W 24/10 |
| 2019/0215719 | A1* | 7/2019 | Wei | H04W 28/06 |
| 2019/0268799 | A1* | 8/2019 | Hong | H04W 4/70 |
| 2019/0327772 | A1* | 10/2019 | Luo | H04L 1/08 |
| 2020/0119864 | A1* | 4/2020 | Xu | H04L 1/1858 |
| 2020/0169941 | A1* | 5/2020 | Chen | H04W 28/085 |
| 2020/0322256 | A1* | 10/2020 | Tang | H04W 28/04 |
| 2020/0374752 | A1* | 11/2020 | Xiao | H04W 76/15 |

(Continued)

FOREIGN PATENT DOCUMENTS

| CN | 107342851 A | 11/2017 |
|---|---|---|
| CN | 108810990 A | 11/2018 |

(Continued)

OTHER PUBLICATIONS

Ericsson, "Controlling of duplication in case of CA" 3GPP TSG-RAN WG2 #97bis, R2-1702753, Apr. 7, 2017, Spokane, USA (4 pages).

(Continued)

*Primary Examiner* — Duc T Duong
(74) *Attorney, Agent, or Firm* — Foley & Lardner LLP

(57) ABSTRACT

This disclosure relates generally to wireless communications and, more particularly, to systems and methods for dynamic configuration of a packet duplication convergence protocol (PDCP) configuration. In one embodiment, a method performed by a communication device includes: receiving configuration information from a communication node; and determining, for a packet duplication protocol per data radio bearer, a number of copies or a logical path based on the configuration information.

22 Claims, 14 Drawing Sheets

(56) References Cited

U.S. PATENT DOCUMENTS

| | | | |
|---|---|---|---|
| 2020/0382246 A1* | 12/2020 | Lee | H04W 80/02 |
| 2021/0136626 A1* | 5/2021 | Wu | H04W 28/0278 |
| 2021/0185559 A1* | 6/2021 | Lee | H04W 28/0289 |
| 2021/0336732 A1* | 10/2021 | Shi | H04L 5/0044 |
| 2021/0345178 A1* | 11/2021 | Shi | H04W 28/12 |
| 2021/0385017 A1* | 12/2021 | Kuo | H04L 5/0032 |
| 2021/0392090 A1* | 12/2021 | Laselva | H04L 1/08 |
| 2022/0014961 A1* | 1/2022 | Baek | H04L 1/08 |
| 2022/0060283 A1* | 2/2022 | Wang | H04L 1/08 |

FOREIGN PATENT DOCUMENTS

| | | |
|---|---|---|
| CN | 109150748 A | 1/2019 |
| KR | 20180108388 A | 10/2018 |
| KR | 20180136898 A | 12/2018 |
| WO | WO-2018/174579 A1 | 9/2018 |

OTHER PUBLICATIONS

Extended European Search Report for EP Appl. No. 19914067.4, dated Mar. 15, 2022 (9 pages).

Nokia et al., "Duplication Impacts to MAC" 3GPP TSG-RAN WG2 Meeting #98, R2-1704272, May 19, 2017, Hangzhou, China (3 pages).

Sharp, "PDCP Duplication in CA" 3GPP TSG-RAN2 Adhoc Meeting, R2-1706791, Jun. 29, 2017, Qingdao, China (6 pages).

International Search Report and Written Opinion for PCT Appl. No. PCT/CN2019/073375, mailed Oct. 30, 2019 (7 pages).

LG Electronics Inc. "Multi-path packet duplication for NR-U" 3GPP TSG-RAN WG2 Meeting #103; R2-1812665; Aug. 24, 2018; Gothenburg, Sweden (2 pages).

3rd Generation Partnership Project, "Technical Speciation Group Radio Access Network; NR; Radio Resource Control (RRC) protocol specification (Release 15)", 3GPP TS 38.331, V15.3.0, Sep. 2018, Valbonne, France (445 pages).

3rd Generation Partnership Project, Technical Specification Group Radio Access Network; NR; Medium Access Control (MAC) protocol specification (Release 15), 3GPP TS 38.321, V.15.3.0, Sep. 2018, Valbonne, France (76 pages).

* cited by examiner

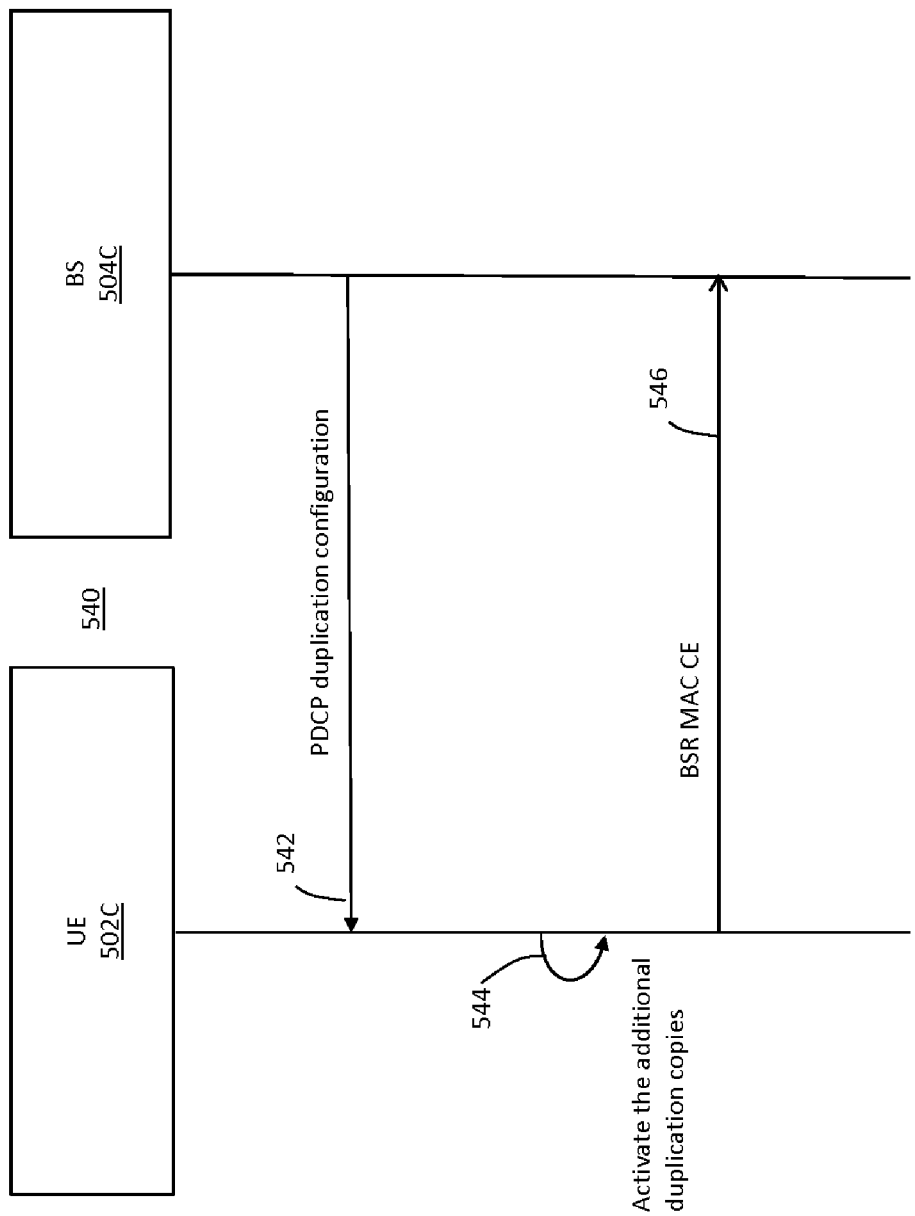

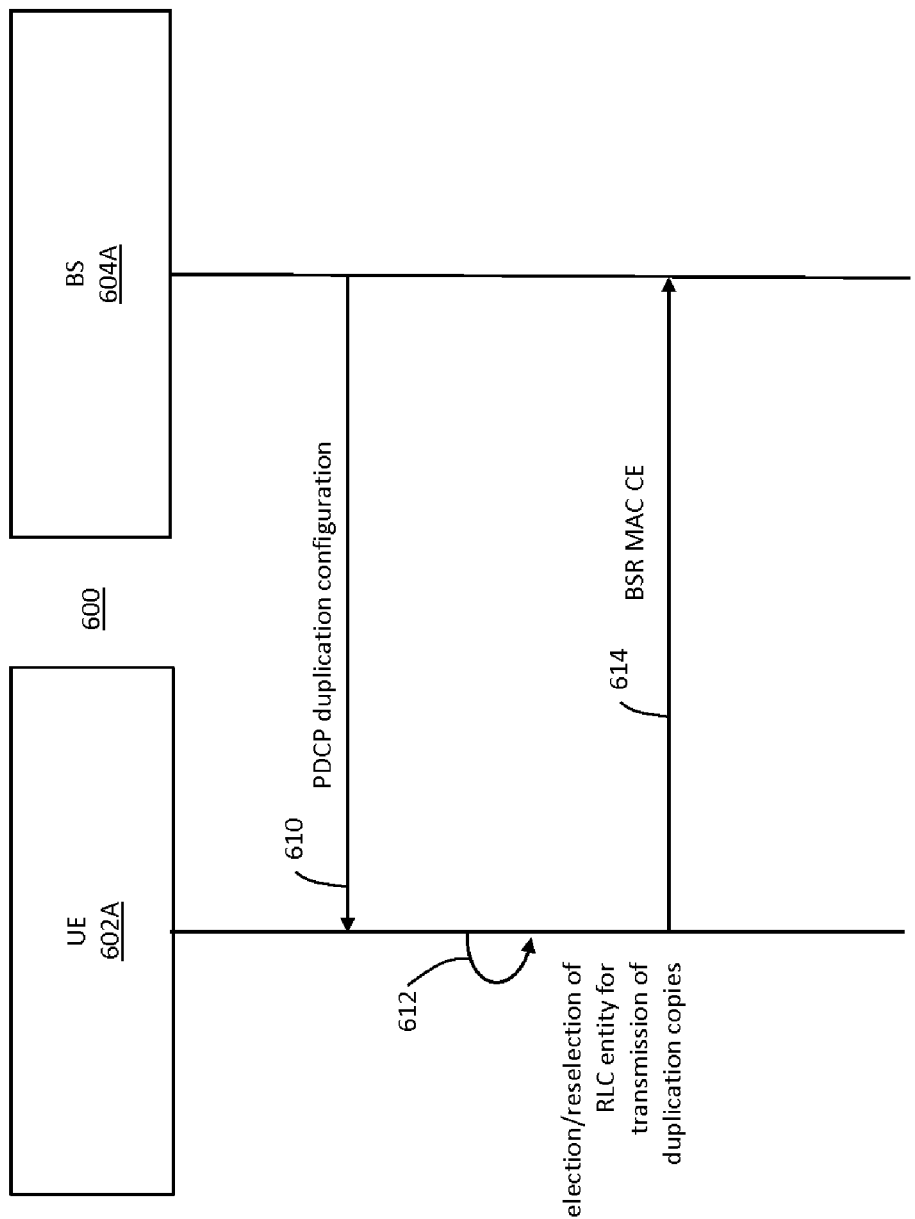

DYNAMIC PACKET DUPLICATION CONVERGENCE PROTOCOL CONFIGURATION

CROSS-REFERENCE TO RELATED APPLICATION

This application claims the benefit of priority under 35 U.S.C. § 120 as a continuation of PCT Patent Application No. PCT/CN2019/073375, filed on Jan. 28, 2019, the disclosure of which is incorporated herein by reference in its entirety.

TECHNICAL FIELD

This disclosure relates generally to wireless communications and, more particularly, to systems and methods for dynamic configuration of a packet duplication convergence protocol (PDCP) configuration.

BACKGROUND

As the number of applications and services for digital data continues to explode, the demands and challenges placed on network resources and operators will continue to increase. Being able to deliver a wide variety of network performance characteristics that future services will demand is one of the primary technical challenges faced by service providers today.

SUMMARY

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

In one embodiment, a method performed by a communication device includes: receiving configuration information from a communication node; and determining, for a packet duplication protocol per data radio bearer, a number of copies or a logical path based on the configuration information.

In a further embodiment, a method performed by a communication node includes: sending configuration information to a communication device, wherein the communication device comprises a centralized unit and a distributed unit, wherein the communication device is configured to determine, for a packet duplication protocol per data radio bearer, a number of copies or a logical path based on the configuration information.

In a further embodiment, a communication device includes: a receiver configured to: receive configuration information from a communication node; and a processor configured to: determine, for a packet duplication protocol per data radio bearer, a number of copies or a logical path based on the configuration information.

In a further embodiment, communication node includes: a centralized unit; a distributed unit; and a transmitter configured to: send configuration information to a communication device, wherein the communication device is configured to determine, for a packet duplication protocol per data radio bearer, a number of copies or a logical path based on the configuration information.

BRIEF DESCRIPTION OF THE DRAWINGS

Various exemplary embodiments of the invention are described in detail below with reference to the following Figures. The drawings are provided for purposes of illustration only and merely depict exemplary embodiments of the invention to facilitate the reader's understanding of the invention. Therefore, the drawings should not be considered limiting of the breadth, scope, or applicability of the invention. It should be noted that for clarity and ease of illustration these drawings are not necessarily drawn to scale.

FIG. 5C is a sequence diagram illustrating a process where a number of copies (e.g., for PDCP duplication) is configured in a UE based solution, in accordance with some embodiments.

FIG. 6A is a sequence diagram illustrating a process of determining a logical path with a set number of copies (e.g., for PDCP duplication) for radio link control (RLC) entity determination in a UE based solution, in accordance with some embodiments.

DETAILED DESCRIPTION

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described and illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

The discussion below may refer to functional entities or processes which are similar to those mentioned above with respect to conventional communication systems. As would be understood by persons of ordinary skill in the art, however, such conventional functional entities or processes do not perform the functions described below, and therefore, would need to be modified or specifically configured to perform one or more of the operations described below. Additionally, persons of skill in the art would be enabled to configure functional entities to perform the operations described herein after reading the present disclosure.

Figure 1:
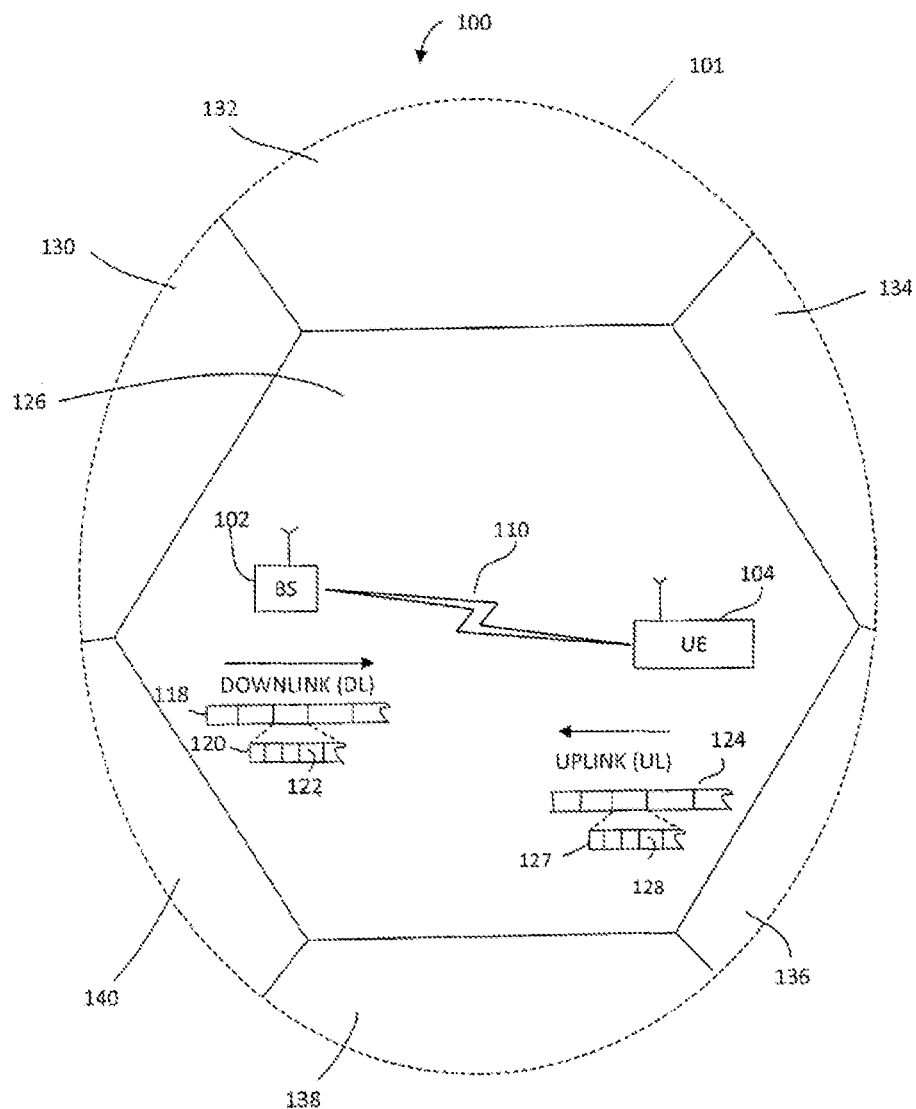
FIG. 1 illustrates an exemplary wireless communication network in which techniques disclosed herein may be implemented, in accordance with some embodiments.

FIG. 1 illustrates an exemplary wireless communication network 100 in which techniques disclosed herein may be implemented, in accordance with an embodiment of the present disclosure. Such an exemplary network 100 includes a base station 102 (hereinafter "BS 102") and multiple user equipment devices 104 (hereinafter "UEs 104") that can communicate with each other via respective communication links 110 (e.g., a wireless communication channel), and a cluster of notional cells 126, 130, 132, 134, 136, 138 and 140 overlaying a geographical area with a network 101. Each UE 104 may undergo a random access procedure to join the network 101. In FIG. 1, the BS 102 and each UE 104 are contained within a respective geographic boundary of cell 126. Each of the other cells 130, 132, 134, 136, 138 and 140 may include at least one BS operating at its allocated bandwidth to provide adequate radio coverage to its intended users. Accordingly, reference to a cell may be a short hand reference to a BS with an associated coverage region or area (e.g., cell). In certain embodiments, a cell may be interchangeably referred to as a BS or a node.

For example, the BS 102 may operate at an allocated channel transmission bandwidth (e.g., spectrum) to provide adequate coverage to each UE 104. The spectrum may be regulated to define a licensed range and/or an unlicensed range. The BS 102 and each UE 104 may communicate via a downlink radio frame 118, and an uplink radio frame 124 respectively. The radio frames may also be referred to more simply as a frame. Each frame 118/124 may be further divided into sub-frames 120/127 which may include data symbols 122/128. In the present disclosure, the BS 102 and each UE 104 are described herein as non-limiting examples of "communication nodes," generally, which can practice the methods disclosed herein. Such communication nodes may be capable of wireless and/or wired communications, in accordance with various embodiments of the invention. In certain embodiments, a communication device may refer more specifically to a UE in relationship to a BS and a communication node may refer more specifically to a BS in relation to the UE.

Figure 2:
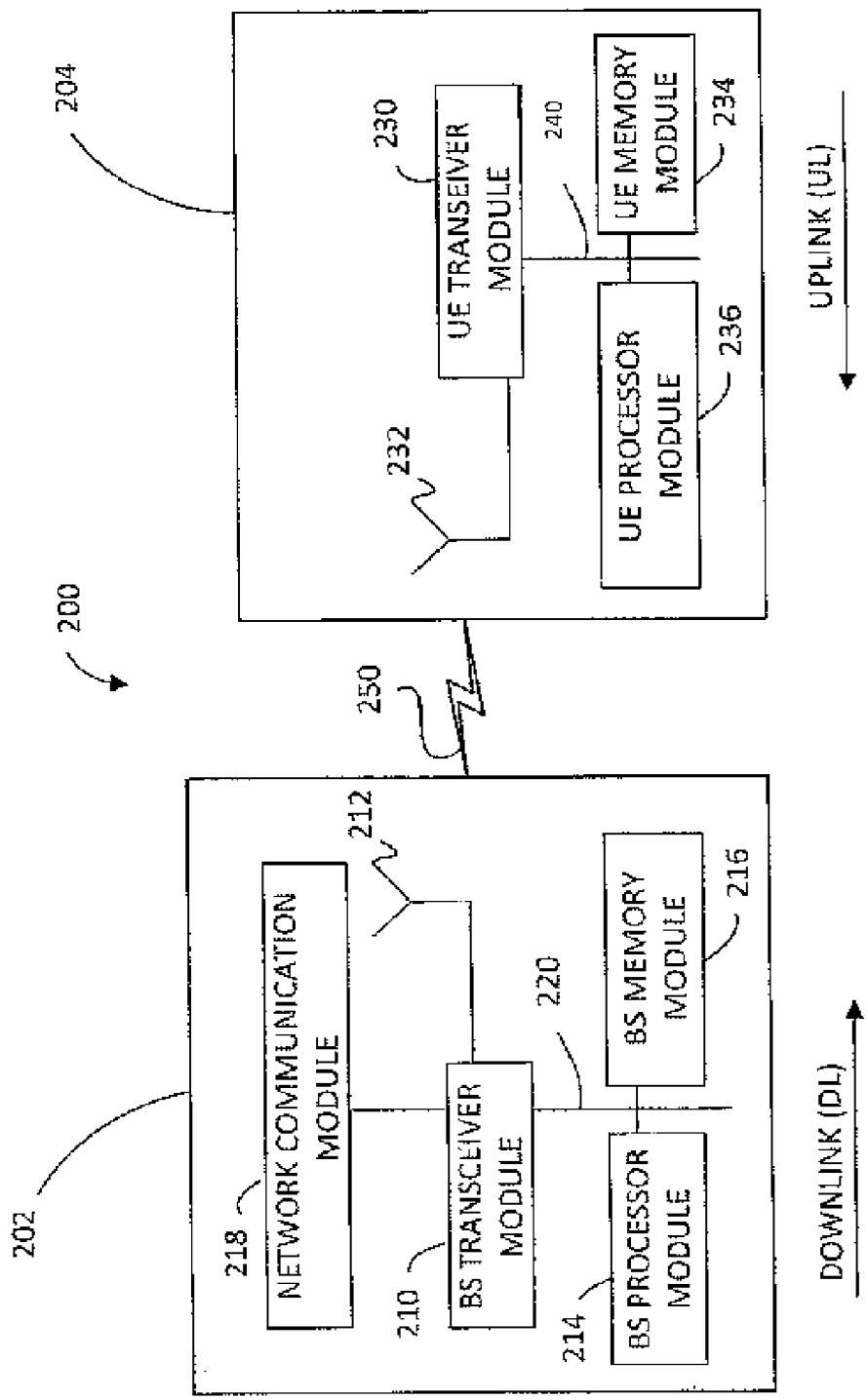
FIG. 2 illustrates a block diagram of an exemplary wireless communication system for transmitting and receiving wireless communication signals in accordance with some embodiments.

FIG. 2 illustrates a block diagram of an exemplary wireless communication system 200 for transmitting and receiving wireless communication signals (e.g., OFDM/OFDMA signals) in accordance with some embodiments of the invention. The system 200 may include components and elements configured to support known or conventional operating features that need not be described in detail herein. In one exemplary embodiment, system 200 can be used to transmit and receive data symbols in a wireless communication environment such as the wireless communication environment or network 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium known in the art suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present invention.

In accordance with some embodiments, the UE transceiver module 230 may be referred to herein as an "uplink" transceiver module 230 that includes a RF transmitter and receiver circuitry that are each coupled to the antenna 232.

A duplex switch (not shown) may alternatively couple the uplink transmitter or receiver to the uplink antenna in time duplex fashion. Similarly, in accordance with some embodiments, the BS transceiver module 210 may be referred to herein as a "downlink" transceiver module 210 that includes RF transmitter and receiver circuitry that are each coupled to the antenna 212. A downlink duplex switch may alternatively couple the downlink transmitter or receiver to the downlink antenna 212 in time duplex fashion. The operations of the two transceiver modules 210 and 230 are coordinated in time such that the uplink receiver is coupled to the uplink antenna 232 for reception of transmissions over the wireless transmission link 250 at the same time that the downlink transmitter is coupled to the downlink antenna 212.

The UE transceiver module 230 and the BS transceiver module 210 are configured to communicate via the wireless data communication link 250, and cooperate with a suitably configured RF antenna arrangement 212/232 that can support a particular wireless communication protocol and modulation scheme. In some exemplary embodiments, the UE transceiver module 210 and the BS transceiver module 210 are configured to support industry standards such as the Long Term Evolution (LTE) and emerging 5G standards, and the like. It is understood, however, that the invention is not necessarily limited in application to a particular standard and associated protocols. Rather, the UE transceiver module 230 and the BS transceiver module 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage and/or computer-readable medium known in the art. In this regard, memory modules 216 and 234 may be coupled to the transceiver modules 210 and 230, respectively, such that the transceiver modules 210 and 230 can read information from, and write information to, memory modules 216 and 234, respectively. The memory modules 216 and 234 may also be integrated into their respective transceiver modules 210 and 230. In some embodiments, the memory modules 216 and 234 may each include a cache memory for storing temporary variables or other intermediate information during execution of instructions to be executed by transceiver modules 210 and 230, respectively. Memory modules 216 and 234 may also each include non-volatile memory for storing instructions to be executed by the transceiver modules 210 and 230, respectively.

The network communication module 218 generally represents the hardware, software, firmware, processing logic, and/or other components of the base station 202 that enable bi-directional communication between the BS transceiver module 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that the BS transceiver module 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically or virtually constructed, programmed, formatted and/or arranged to perform the specified operation or function.

It may be desirable for a packet data convergence protocol (PDCP) to introduce duplication with multiple copies for increasing the robustness of uplink (UL) transmissions. This PDCP duplication with multiple copies may impinge upon an issue where the UL transmission operation may have multiple radio link control (RLC) entities are associated with PDCP. Also, this PDCP duplication with multiple copies may impinge on activation and/or deactivation of PDCP duplication with multiple copies.

5G New Radio (NR) may introduce a dual connection structure for communications. More specifically, a UE may be configured with two RLC entities for PDCP. For example, a UE may perform selection of the RLC entity. Also the PDCP data packet data unit (PDU) may be utilized by the RLC entity while the PDCP data PDU is generated for either activated duplication or deactivated duplication. For ease of discussion, reference to duplication may refer to PDCP duplication and reference to copies may refer to copies made in the course of PDCP duplication.

In various embodiments, when PDCP duplication is activated, a PDCP may generate two copies of a PDCP data PDU and transfer them to the two associated RLC entities respectively. When PDCP duplication is deactivated, the PDCP may transfer a PDCP data PDU to a RLC entity when at least one of the following two conditions are satisfied. The first condition may be when the total amount of data volume pending for initial transmission in a PDCP entity and the two associated RLC entities is more than or equal to ul-dataSplitThreshold. Then, the PDCP entity can submit the generated PDCP data PDU to either a primary RLC entity or a secondary RLC entity. The second condition may be when a PDCP entity submits the generated PDCP data PDU to a primary RLC entity.

In particular embodiments, activation/deactivation of PDCP duplication may be based on a RRC configuration or reconfiguration. More specifically, an information element (IE) or field "pdcp-Duplication" configured in a PDCP configuration may be set or reset to a "true" or a "false" value for activating or deactivating PDCP duplication.

In further embodiments, activation/deactivation of PDCP duplication may be based on activation or deactivation of PDCP duplication as indicated in a medium access control (MAC) control element (CE). More specifically, a data radio bearer identifier (ID) may be included into a MAC CE for indicating activation or deactivation of PDCP duplication. The MAC entity may notify to a higher layer after the reception of this MAC CE.

In various embodiments, PDCP duplication may be introduced for improving the robustness of data transmission for the New Radio Internet of Things (NRIIOT). For example, PDCP duplication may be applied in layer 2 (L2) and/or layer 3 (L3) to improve the robustness of data transmissions. Specifically, resource efficient PDCP duplication may coordinate between the nodes for PDCP duplication activation for resource efficiency insurance, thus avoiding unnecessary duplicate transmissions. Also, PDCP duplication with more than 2 copies may leverage a combination of dual connectivity (DC) and/or carrier aggregation (CA) where data transmission takes places from at most two nodes.

Figure 3:
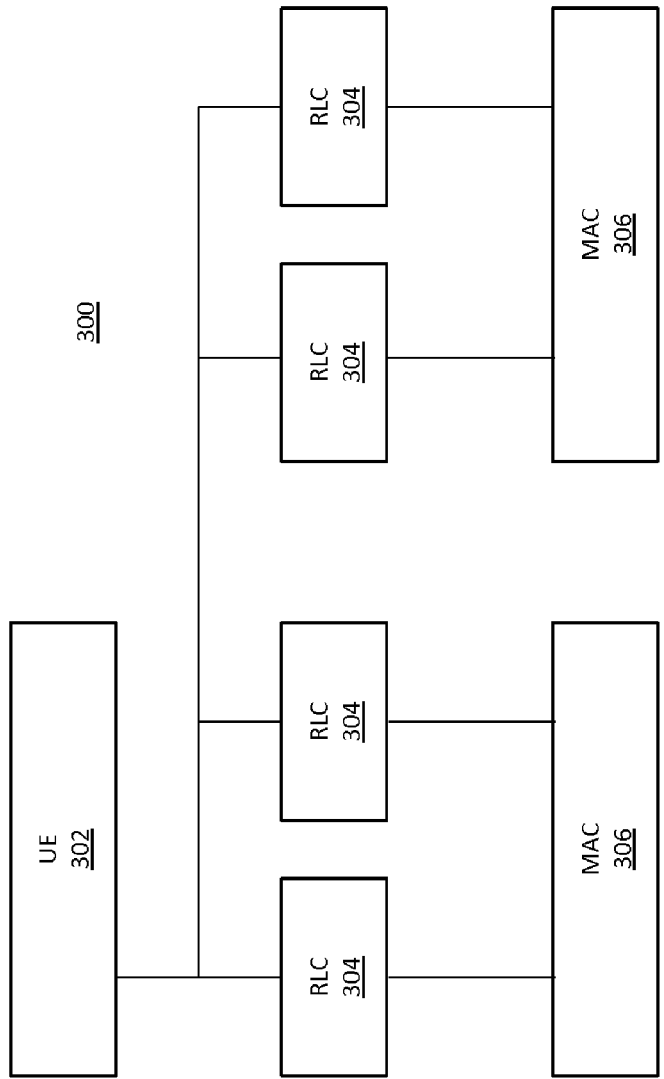
FIG. 3 is a block diagram of packet data control protocol (PDCP) duplication with more than two copies, in accordance with some embodiments.

FIG. 3 is a block diagram of packet data control protocol (PDCP) duplication with more than two copies, in accordance with some embodiments. The block diagram 300 may include a UE 302 that utilizes four RLC entities 304. Each two of the RLC entities 304 may utilize a respective MAC 306. Each RLC entity 304 may facilitate transmission of a respective copy. Also, the combination of a particular RLC entity and a particular MAC, along with an associated serving cell/BS (not illustrated), may be referred to as a logical path (which may include the RLC entity and the corresponding logical channel (LCH) and corresponding air interface). Thus, the block diagram 300 may include 4 copies (e.g., due to four RLC entities), which is greater than implementations that utilize 2 copies.

Accordingly, PDCP duplication with more than 2 copies can more easily meet a reliability requirement of data transmission than just 2 copies. However, more duplication copies means a greater waste of resources. Thus, it may be desirable to design a technique to improve data transmission reliability with reduced resource consumption.

Systems and methods in accordance with various embodiments disclose a dynamic PDCP configuration. More specifically, a dynamic PDCP configuration may resolve how to activate or deactivate PDCP duplication with multiple copies and how to operate UL transmissions under both activated and deactivated PDCP duplication. This deactivation or activation of PDCP duplication may be either UE based, network (NW) based, or a combination of both UE based and NW based. By being network based, the dynamic PDCP configuration may determine a PDCP duplication configuration from a cell, or BS from which a UE interfaces with the NW. Also, by being UE based, the dynamic PDCP configuration may determine a PDCP duplication configuration from a UE in a flexible manner.

In various embodiments for UL transmissions with more than two RLC entities associated with a PDCP entity, the following two steps may be referred to as baseline steps. Baseline step 1 may be when a UE receives the PDCP duplication configuration from the NW. Baseline step 2 may be the activation or deactivation of the PDCP duplication and determination of the number of copies (e.g., duplication copies) and determination of the radio link control entity and/or serving cell used for each copy transmission according to a measurement result from a UE side and/or through a control signal from the NW (e.g., as directed by the NW).

For ease of discussion, various exemplary issues will be discussed in turn below with reference to these baseline steps.

A first exemplary issue may be which parameters may be used for PDCP duplication. In various embodiments, an initial state of PDCP duplication may be indicated for carrier aggregation (CA) duplication and/or dual connectivity (DC) duplication. A primary path for duplication may indicate a primary path which can be used for transmission of a PDCP data PDU while duplication is deactivated and for transmission of a PDCP control PDU while duplication is activated. This primary path can be configured per cell group. Also, the primary path may include a cell group (CG) indication (e.g., a CG identifier) and/or a logical channel (LCH) identifier (ID). A threshold value of PDCP duplication may be used for activation or deactivation of PDCP duplication, including CA duplication and DC duplication. The threshold value for UL transmission operation may be used for UE based UL transmission operations. Also, a time window configuration parameter may be used for UE monitoring of a current wireless environment.

Various embodiments may include a network (e.g., a cell or a BS) with a centralized unit (CU) and distributed unit (DU), also referred to as a CU/DU split case. In the CU/DU split case, a DU may notify the CU of the configured LCH ID. Then, the CU may allocate the LCH ID for an initial state of PDCP duplication. Similarly a DU may notify a CU of a configured primary path per cell group. This notification may be performed via a radio link.

A second exemplary issue for resolution is how to handle a number of PDCP duplication copies during the baseline step 2. In various embodiments, for situations where PDCP duplication utilizes multiple copies (e.g., more than 2 copies), the following options may be utilized. As a first option, the number of PDCP duplication copies may be directly handled the same whether they are for CA or DC. As a second option, CA duplication and DC duplication is treated separately. More specifically, they may be treated separately where: the NW controls both CA duplication and DC duplication activation/deactivation; the NW control DC duplication, while CA duplication is handled by UE itself; the NW control CA duplication, while DC duplication is handled by UE itself; or lastly, both CA and DC duplication may be handled by UE itself. Accordingly, PDCP duplication control may be thought of as in two layers. That is, one for DC duplication, the other one for CA duplication.

In further embodiments, in situations where a NW has a split CU-DU (e.g., a CU/DU split), a CU may notify a DU of a configuration or reconfiguration of a PDCP duplication state for scheduling of a UL grant by the DU. This notification may further include an activated RLC entity, LCH indicator, cell group indicator, and/or a number of PDCP duplication indicator.

A third exemplary issue for resolution may be how to determine a number of copies when PDCP duplication is activated in the context of baseline step 2. For this third exemplary issue, the number of the duplication copies (e.g., more than 2) may be dynamically determined according to a current wireless environment if the duplication is activated. The following three alternative embodiments may illustrate aspects of exemplary solutions for this third exemplary issue. A first alternative embodiment may focus on a NW based scheme. More specifically, as a normative method, the NW can configure a number of copies according to a current wireless environment and a service reliability requirement as determined through either MAC CE or a radio resource control (RRC) configuration. For example, the MAC CE may include an indicator of the number of the copies or an indicator of a duplication activated LCH or an indicator of whether there is to be CA or DC duplication. In certain embodiments, this MAC CE may be the same as, or different than, a MAC CE that indicates PDCP duplication activation or deactivation Certain embodiments may utilize dual connection (DC) duplication. More specifically, an inter-node configuration may be introduced that dictates a configuration between a master node (MN) and a secondary node (SN) to determine whether DC duplication should be used. This determination may be communicated to the UE via RRC signaling, a PDCP Control PDU or a MAC CE, for example. The PDCP Control PDU can be sent to UE from MN and SN. However, a MAC CE may be sent from only one node in certain embodiments. For instance, a MN may ask a SN to send the MAC CE for itself when the MN determines that its signal quality is not good enough (e.g., does not meet a threshold value).

In further embodiments, in situations where a NW is configured with a CU/DU split, a DU can derive the duplication state information through CU notification or a buffer state report (BSR) MAC CE from a UE side.

A second alternative embodiment may focus on a UE based scheme. This UE based scheme may contrast with the NW based scheme, which may have a slower reaction to a current wireless communication than this UE based scheme due, for example, to an inability to determine how communications are performed across other nodes. Thus, the UE based scheme may be utilized for PDCP duplication with multiple copies (e.g., 2+ copies). In certain embodiments this UE based scheme may have a first step where the PDCP entity is established or re-established at the UE. The establishment or reestablishment of the PDCP entity may be based on configuration information. For example, this configuration information may include any of: a minimum number of copies per data radio bearer; a maximum number of copies; a cell group identifier; a serving cell identifier; a logical channel identifier; a carrier aggregation duplication indicator; a dual connectivity duplication indicator; an initial number of copies; an activation timer; a deactivation timer; a measurement window length for the packet duplication protocol; a copy determination threshold value for determining the number of copies; a logical path selection threshold value for selection of the logical path; a carrier aggregation determination threshold value for determining an activation of carrier aggregation duplication; a dual connectivity determination threshold value for determining an activation of dual connectivity duplication; a carrier aggregation determination threshold value for determining a deactivation of carrier aggregation duplication; and/or a dual connectivity determination threshold value for determining a deactivation of dual connectivity duplication.

As a second step, if a current number of copies does not meet a reliability requirement of a data radio bearer (DRB) during a measurement window, then the UE may increment the number of current copies by 1 or activate an extra CA duplication, or activate an extra DC duplication.

A third step may include two alternative embodiments after incrementation of the PDCP duplication copies. As the first alternative embodiment, if a previous number of copies of PDCP duplication or the previous state of PDCP duplication transmissions can meet the reliability requirement of the DRB within the measurement window, then the UE may perform a decrement of the current number of copies by 1 or deactivate the extra CA duplication, or deactivate the extra DC duplication. As the second alternative embodiment, one timer may be started or restarted when the additional duplication copies are activated. An indicator received from a higher layer or a lower layer for any of an original number of copies for transmission or a measurement performed by a PDCP layer which means that a current measurement result for any original number of copies are lower than the threshold value configured in the configuration information and that an associated timer should be restarted. If there is no any indicator received from the lower layer or the higher layer for any copies transmission with original number or if the measurement by the PDCP layer itself means the current measurement result for original number of copies are greater than the threshold value configured in the configuration information, then the extra number of copies or the extra CA duplication or the extra DC duplication should be deactivated as soon as the expiry of the timer. In various embodiments, the UE may repeat the second step until the measurement result meets the reliability requirement of a DRB during a measurement window.

A fourth step may include two alternative embodiments. The first alternative embodiment may be applied in UL transmissions with multiple copies if extra duplication copies or extra CA duplication or extra DC duplication is activated. In this first alternative embodiment, a buffer state report procedure may be triggered to notify a network (e.g., an associated BS, cell, or gNB) that the new activated duplication copy has data for transmission. The second alternative embodiment may be applied in UL transmissions with multiple copies if duplication copies or CA duplication or DC duplication is deactivated. In this second alternative embodiment, a buffer state report procedure may be triggered to notify a network (e.g., an associated BS, cell, or gNB) of the deactivated copy (e.g., the deactivated copy in which an associated buffer state and/or logical path may be calculated).

For the second step and the third step, one or more of the following information can be measured for judging whether the current transmission can match the reliability requirements or not: channel state information for each serving cell, including physical (PHY) layer measurements or a higher layer other than PHY layer measurements; a successful RLC PDU transmission ratio within a certain period (e.g., as related to a calculation of reliability for each RLC entity); and a successful PDCP PDU transmission ratio within a certain period (e.g., as related to a calculation of reliability for PDCP).

A third alternative embodiment may focus on activation or deactivation of PDCP duplication by UE request. For this alternative embodiment, a UE can request permission to perform activation or deactivation of CA duplication or DC duplication or additional duplication copies from the NW side. For ease of discussion, this alternative embodiment may be described with three steps. As a first step, the UE may receive a PDCP duplication configuration from the NW side. As a second step, if the current number of copies does not meet a reliability requirement of a DRB during a measurement window, the UE may generate one MAC CE to notify the NW of the requirement of additional copies or activation of extra CA duplication or activation of extra DC duplication. In certain embodiments, the MAC CE may include a logical channel ID (LCH ID) which indicates an extra PDCP duplication copy request. In further embodiments, the MAC CE may include an indicator of copy numbers or extra CA duplication or extra DC duplication. This indicator may further include a LCH ID, serving cell ID, and/or a cell group ID. In yet further embodiments, the MAC CE may include an activation/deactivation indicator (e.g., used for activation/deactivation of DC duplication/CA duplication/additional duplication). As a third step, the NW may generate a MAC CE in response to receiving the requirement from the UE side. Otherwise, no feedback information is provided from the NW to the UE. In certain embodiments, the MAC CE may include a logical channel ID (LCHID) which indicates an extra PDCP duplication copies request. In further embodiments, the MAC CE may include an indicator of copy numbers or extra CA duplication or extra DC duplication. This indicator may be a LCH ID, serving cell ID, and/or a cell group ID. In yet further embodiments, the MAC CE may include an activation/deactivation indicator (e.g., used for activation/deactivation of DC duplication/CA duplication/additional duplication).

A fourth exemplary issue may refer to how to ensure UL transmission reliability if a number of copies is predetermined. For example, when PDCP duplication is activated, PDCP may generate multiple copies for UL transmission data. Also, the PDCP may select associated RLC entities for transferring the generated copies. Accordingly, a RLC selection scheme and/or a cell selection scheme may be utilized to achieve a 10^-8 error rate for NRIIOT and to compensate for unstable wireless environments.

In various embodiments, a RLC selection scheme may be used in the case that the number of the RLC entities is greater than the current number of copies. Various embodiments of a RLC selection scheme may include a UE based solution and NW based solution. The UE based solution may include a first step, a second step and a third step. As the first step, if PDCP duplication is activated, multiple RLC entities may be configured by the UE through an RRC configuration. This configuration may be based on criteria for the selection of RLC entities, including the switch out threshold for PDCP, Lout, and switch in threshold for PDCP, Lin. In certain embodiments, the criteria for selection of RLC entities can include, for example, channel state information (e.g., a received signal reference power (RSRP) and/or a reference signal received quality (RSRQ) and/or a signal to interference plus noise ratio (SINR) or other information which can indicate the current transmission state of the LCH associated with the RLC entity. As the second step, if any current measurement result of an associated available RLC entity for PDCP duplication is lower than the Lout threshold, and if the measurement result of other RLC entities is greater than Lin threshold, then the UE should select or reselect to a suitable RLC entity instead of the current RLC entity as available for PDCP duplication copy transmission. As the third step, a buffer state report procedure may be triggered for notifying the network (e.g., an associated BS, cell, or gNB) of the RLC entity switch that occurs. In certain embodiments, the buffer state report procedure may produce a buffer state calculation of the switch in RLC entity that may be added with the buffer state of the PDCP. In further embodiments, the buffer state report procedure may produce a buffer state calculation of the switch out RLC entity that may be subtracted from the buffer state of the PDCP.

In addition to the UE based solution, various embodiments may also provide a NW based solution for a RLC selection scheme. This NW based solution may reconfigure the associated RLC entity, used for PDCP duplication, through the RRC reconfiguration message or MAC CE message. This MAC CE message may include an identification of an RLC entity, an activation/deactivation indicator, or an identification of a cell group. The identification of an RLC entity may be an LCH ID in certain embodiments. The activation/deactivation indicator may be utilized as needed dependent on the structure of identification of the RLC entity in the MAC CE (e.g., since the deactivate and activate indicators for an RLC entity may occur simultaneously in certain embodiments). Also, the identification of a cell group may be used when the MAC CE is sent across different nodes (e.g., a MN send the MAC CE to the UE to control the RLC entity which belongs to a SN)). In various embodiments, an RRC message may include a related RLC entity identity (e.g., a LCH ID) for which PDCP duplication is activated, as well as an identification of a cell group. In certain embodiments, after the transmission of a related ACK/NACK (e.g., acknowledgement/non acknowledgement) with the reception of a RRC reconfiguration message and/or MAC CE message, the corresponding PDCP data PDU copies may be sent to the new configured RLC entity. In embodiments with a CU/DU split case, a DU can derive the RLC selection information (e.g., for LCH selection) through a CU notification or a BSR MAC CE from UE side. The RLC selection information may include the LCH ID, which may be associated with an activated duplication transmission or deactivated duplication transmission, cell group ID, or LCH subset.

In various embodiments, a cell selection scheme may be used for optimizing the specific copy transmission, (e.g., reconfigures LCH to cell mapping relationships). This cell selection scheme may include a UE based solution or a NW based solution. For the UE based solution, this cell selection scheme may be utilized across three exemplary steps. As a first step, when PDCP duplication is activated, multiple serving cell(s) may be configured for each copy transmission (e.g., via a LCH to cell restriction method) through a RRC message. Also, a criterion for selection of the serving cell(s) may be included in the RRC message (e.g., the Lout and Lin threshold). For this step, a criterion for selection of serving cell(s) can be channel state information (e.g., for measurement or determination of RSRP, RSRQ, SINR, and the like) or other information which can indicate the current transmission state of the serving cell associated with each copy. The criterion may include the switch out threshold Lout and the switch in threshold Lin. As a second step, if the measurement of current serving cell(s) are associated with one copy transmission is lower than the Lout and the measurement of serving cells from a candidate serving cell set, then the UE may perform selection or reselection of a restricted serving cell(s) (e.g., a currently used serving cell). Also, if the measurement of any serving cell(s) are greater than the Lin threshold, then the UE may select these serving cells as a restricted serving cell associated with the copy transmission. As a third step, a MAC CE may be generated to notify the NW as to selection or reselection of configured serving cell (e.g., as a set) for a corresponding copy transmission. Such a MAC CE may include a logical channel identifier and/or a serving cell ID which indicates the serving cell(s) configured as the restriction (e.g., as associated with a currently used logical path) associated with one LCH in a logical channel priority (LCP) procedure.

In addition to the UE based solution, this LCH cell selection scheme may include the NW based solution in accordance with various embodiments. This NW based solution may reconfigure a set of the serving cells for one copy transmission which is responsible for PDCP duplication transmission according to the current channel state information or other information through a RRC message or MAC CE message. The MAC CE message may include, for example, an identification of a logical channel and/or an identification of serving cells. In embodiments with a CU/DU split case, a DU can derive the reconfiguration of serving cell information for the associated LCH information through CU notification or BSR MAC CE from UE side. The reconfiguration of serving cell information may include the serving cell ID which is activated for duplication transmission, the serving cell ID which is deactivated for duplication transmission, and the associated LCH ID and CG ID.

A fifth exemplary issue may refer to UE behavior if a current UL transmission does not match a reliability requirement, in view of the third and fourth exemplary issues. In certain embodiments, a RLC selection/reselection and/or a serving cell selection/reselection may be utilized prior to increasing a number of copies (e.g., activating additional PDCP duplication) when a current UL transmission does not match a reliability requirement. For example, before a determination to increment a number of PDCP copies or to activate additional CA or DC duplication, each leg (e.g., an individual logical path, which includes the RLC entity and the corresponding LCH and the corresponding air interface) associated with a PDCP entity may be modified to meet a reliability requirement when any of the following two cases are satisfied. As the first case, for RLC-selection/reselection, none of the candidate RLC entities may be able to meet the reliability requirements. More specifically, all of the measurement results of a serving cell associated with a candidate RLC entities may be lower than a Lin threshold. As the second case, for serving cell selection/reselection for the specific copy transmission, none of the candidate serving cells meet the reliability requirements. More specifically, the measurement results of the candidate serving cells are lower than Lin threshold.

Figure 4:
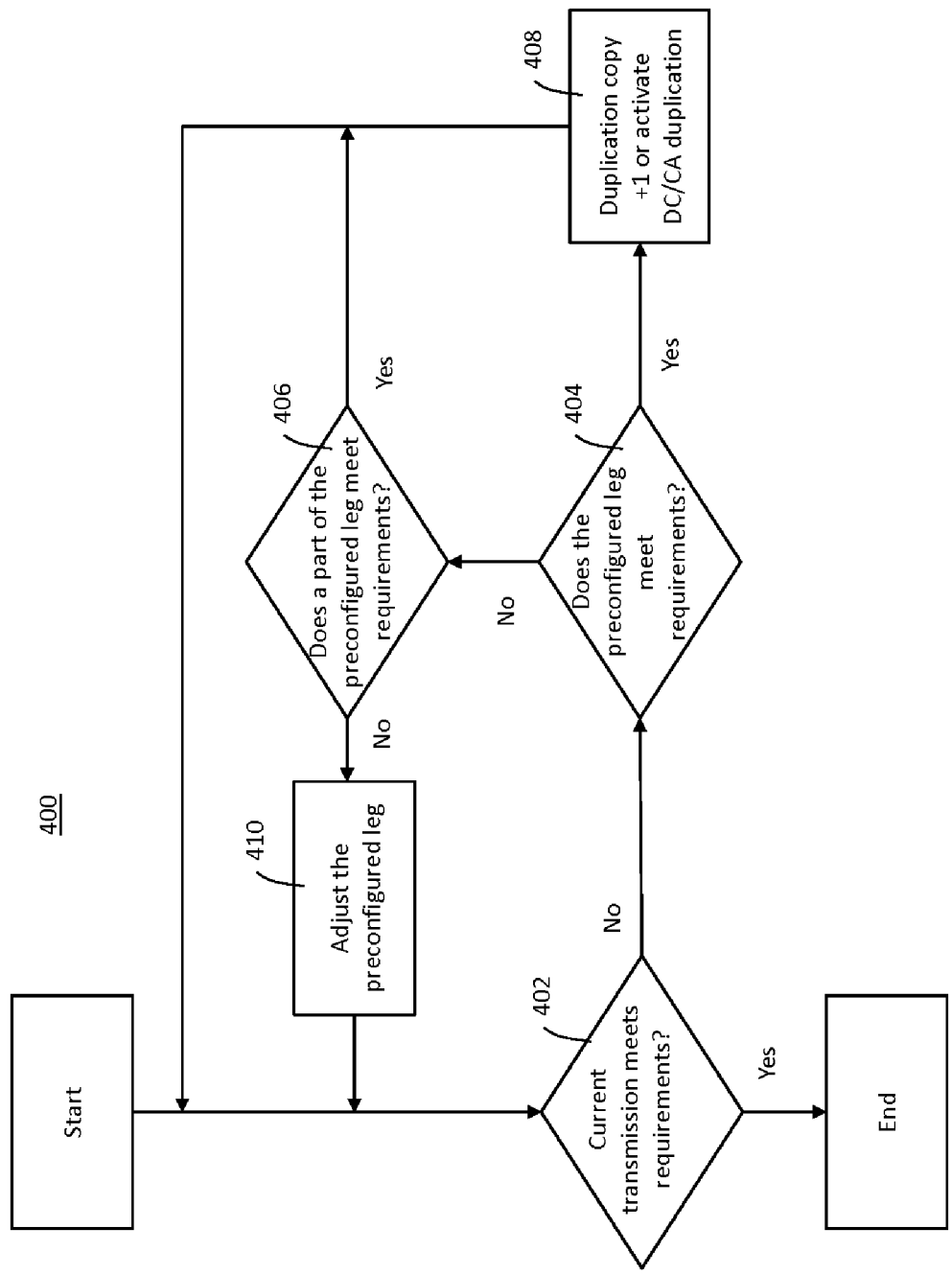
FIG. 4 is a flow chart illustrating a process of user equipment (UE) behavior when a current uplink (UL) transmission does not match a reliability requirement, in accordance with some embodiments.

FIG. 4 is a flow chart illustrating a process 400 of UE behavior when a current UL transmission does not match a reliability requirement, in accordance with some embodiments. The process 400 may be performed by a UE. It is noted that the process 400 is merely an example, and is not intended to limit the present disclosure. Accordingly, it is understood that additional operations (e.g., blocks) may be provided before, during, and after the process 400 of FIG. 4, certain operations may be omitted, certain operations may be performed concurrently with other operations, and that some other operations may only be briefly described herein.

At operation 402, the process 400 may begin with a determination as to whether a current transmission meets certain reliability requirements. As noted above, these requirements may be, for example, predetermined communication requirements (e.g., communication reliability requirements). If so, the process 400 may proceed to process 400 completion 403. If not, the process 400 may proceed to operation 404.

At operation 404, a determination is made as to whether a preconfigured leg meets the requirements. The preconfigured leg may refer to an individual logical path for PDCP. This preconfigured leg may be, for example, have a predetermined configuration set in system information or other information accessible upon system initialization or upon initial performance of the process 400. If so, the process 400 may proceed to operation 406. If not, the process 400 may proceed to operation 408.

At operation 408, the number of duplication copies may be incremented by one. Alternatively, either DC duplication and/or CA duplication may be performed. The performance of either incrementing the number of duplication copies, DC duplication, or extra CA duplication may be performed in a predetermined manner (e.g., as set out in system information).

At operation 406, a decision may be made as to whether a part of the preconfigured leg meets certain requirements. This may refer to, for example, a part of an individual logical path for PDCP, such as an individual RLC entity, MAC entity, or serving cell. If so, the process 400 may proceed back to operation 402. If not, the process 400 may proceed to operation 410.

At operation 410, the UE may adjust the preconfigured leg. The UE may adjust the preconfigured leg by, for example, changing out an individual RLC entity for another RLC entity, an individual MAC entity for another MAC entity, individual serving cell for another serving cell, or changing out an entire individual leg for another leg. This other leg that may be changed out for the preconfigured leg may be, for example, a saved leg (e.g., a leg preconfigured for changing out in operation 410.

A sixth exemplary issue may refer UE behavior on UL transmission where a primary path is configured per CG. This may refer to, for example, a first case where PDCP duplication is activated and a second case where PDCP duplication is deactivated. Embodiments where PDCP duplication is activated may refer to a first subcase where only CA duplication is activated. When only CA duplication is activated, the PDCP control PDU may be transmitted only through the primary path (e.g., a predetermined path that is noted as the primary path) in the cell group where the CA duplication is activated. However, when only DC duplication is activated, the PDCP control PDU may be transmitted only through the primary path that belongs to a master node (MN). Embodiments where PDCP duplication is activated may refer to a second subcase where only DC duplication is activated. When only DC duplication is activated, the PDCP control PDU may be transmitted through either the primary path associated with the MN or the primary path associated with a secondary node (SN). Embodiments where PDCP duplication is activated may refer to a third subcase where CA and DC duplication is activated. In this subcase, the PDCP control PDU is transmitted through a primary path of a MN. Alternatively, the PDCP control PDU may be transmitted through either the primary path of the MN or the primary path of the SN. Accordingly, certain embodiments may disclose a PDCP control PDU uplink transmission operation.

Various embodiments may also cover where PDCP duplication is deactivated. When PDCP duplication is deactivated, the generated PDCP PDU may be transmitted in the primary path configured in a MN if the data volume contained in both a buffer in the PDCP entity and the RLC entity is smaller than a configured threshold ULdataThreshold. Otherwise, the generated PDCP PDU may be sent via either the primary path configured in a MN or the primary path configured in the SN. Accordingly, certain embodiments may disclose a PDCP PDU uplink transmission operation.

Figure 5A:
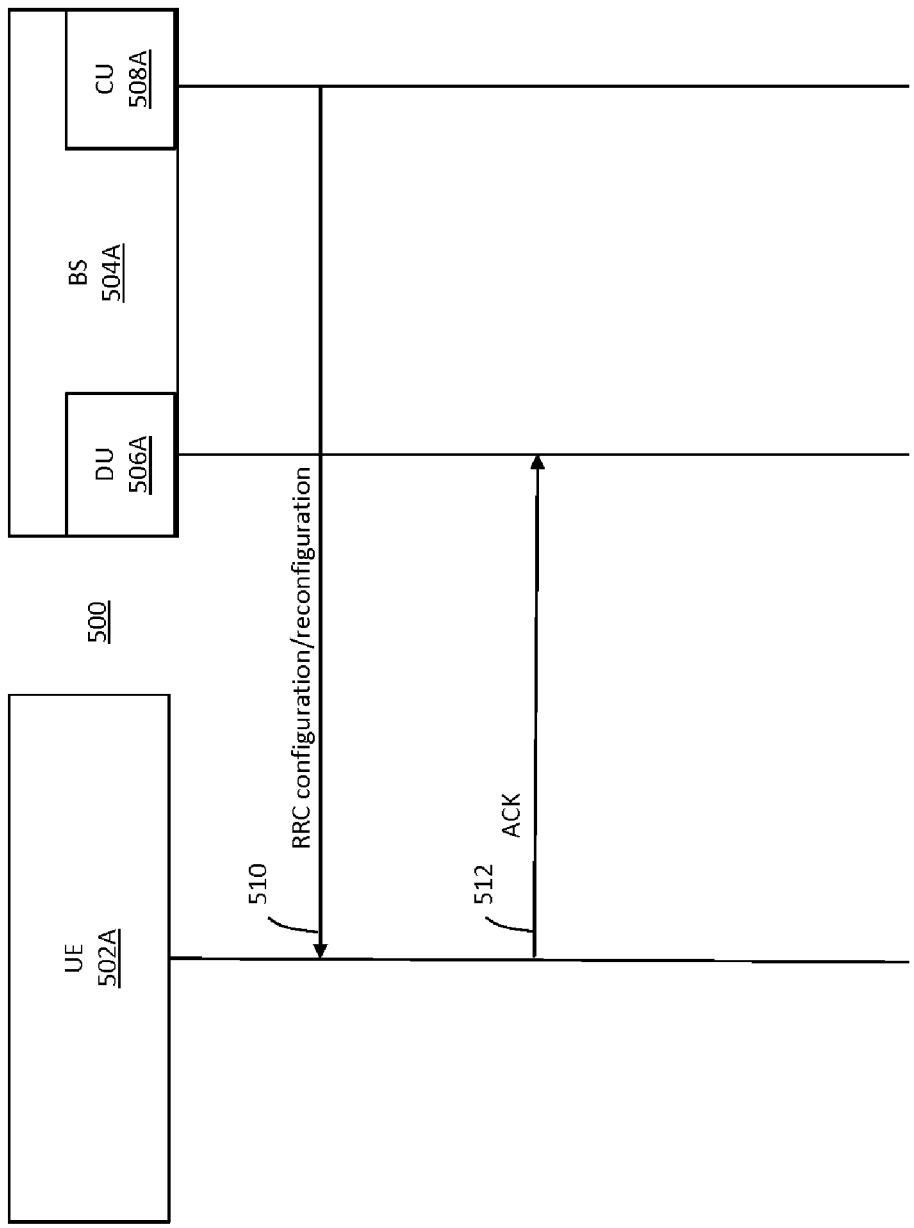
FIG. 5A is a sequence diagram illustrating a process where a number of copies (e.g., for PDCP duplication) is configured by radio resource control (RRC) signaling in a network based solution, in accordance with some embodiments.

FIG. 5A is a sequence diagram illustrating a process 500 where a number of copies (e.g., for PDCP duplication) is configured by radio resource control (RRC) signaling in a network based solution, in accordance with some embodiments. The process 500 may provide a solution to, for example, the third exemplary issue, discussed above. The process 500 may be performed by a UE 502A and a BS 504A (e.g., a NW), which may include a DU 506A and a CU 508A (e.g., a DU/CU split). It is noted that the process 500 is merely an example, and is not intended to limit the present disclosure. Accordingly, it is understood that additional operations (e.g., blocks) may be provided before, during, and after the process 500 of FIG. 5A, certain operations may be omitted, certain operations may be performed concurrently with other operations, and that some other operations may only be briefly described herein.

At operation 510, the CU 508A of the BS 504A may generate RRC configuration signaling (e.g., configuration information via RRC) and transmit this RRC configuration signaling to the UE 502A for controlling a number of PDCP duplication copies. This RRC configuration signaling may refer to any configuration, whether a new configuration or a reconfiguration.

At operation 512, the UE 502A may transmit an ACK (e.g., an acknowledgement) for the RRC configuration signaling to the DU 506A of the BS 504A. This ACK may indicate to the BS 504A that the UE will begin to perform UL transmissions with the configured number of copies (e.g., after transmitting the ACK). In optional embodiments, the DU 506A may derive other PDCP duplication related information (e.g., a configuration of CA or/and DC duplication or duplication copies) based on information received from the CU 508A or a BSR MAC CE sent to the DU 506A from the UE 502A.

Figure 5B:
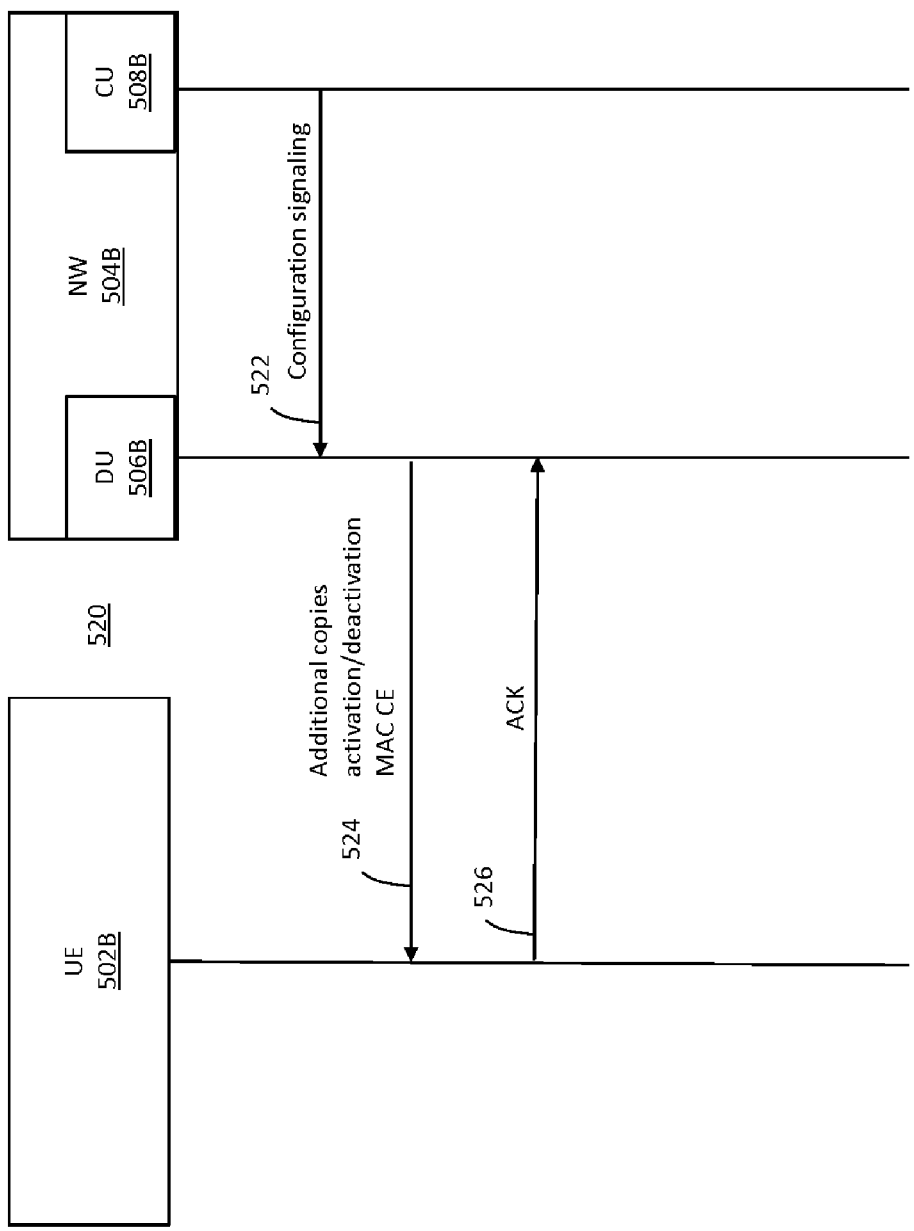
FIG. 5B is a sequence diagram illustrating a process where a number of copies (e.g., for PDCP duplication) is configured by a medium access control (MAC) control element (CE) in a network based solution, in accordance with some embodiments.

FIG. 5B is a sequence diagram illustrating a process 520 where a number of copies (e.g., for PDCP duplication) is configured by a medium access control (MAC) control element (CE) in a network based solution, in accordance with some embodiments. The process 520 may provide a solution to, for example, the third exemplary issue, discussed above. The process 520 may be performed by a UE 502B and a BS 504B (e.g., a NW), which may include a DU 506B and a CU 508B (e.g., a DU/CU split). It is noted that the process 520 is merely an example, and is not intended to limit the present disclosure. Accordingly, it is understood that additional operations (e.g., blocks) may be provided before, during, and after the process 520 of FIG. 5B, certain operations may be omitted, certain operations may be performed concurrently with other operations, and that some other operations may only be briefly described herein.

At operation 522, the CU 508B may send configuration information via configuration signaling to the DU 506B. At operation 524, the DU 506B may transmit a MAC CE to the UE that commands the UE to activate or reactivate CA duplication, DC duplication and/or to increase or decrease a number of duplication copies for PDCP duplication.

At operation 526, the UE 502B may transmit an ACK (e.g., an acknowledgement) for the MAC CE to the DU 506B of the BS 504B. This ACK may indicate to the BS 504B that the UE will begin to perform UL transmissions with the configured number of copies or configured duplication method (e.g., after transmitting the ACK).

FIG. 5C is a sequence diagram illustrating a process 540 where a number of copies (e.g., for PDCP duplication) is configured in a UE based solution, in accordance with some embodiments. The process 540 may provide a solution to, for example, the third exemplary issue, discussed above. The process 540 may be performed by a UE 502C and a BS 504C (e.g., a NW). It is noted that the process 540 is merely an example, and is not intended to limit the present disclosure. Accordingly, it is understood that additional operations (e.g., blocks) may be provided before, during, and after the process 540 of FIG. 5C, certain operations may be omitted, certain operations may be performed concurrently with other operations, and that some other operations may only be briefly described herein.

At operation 542, the UE 502C may receive a PDCP duplication configuration (e.g., configuration information) from the BS (e.g., the NW side). This PDCP duplication configuration (e.g., configuration information) may include, for example, any of: a minimum number of copies per data radio bearer; a maximum number of copies; a cell group identifier; a serving cell identifier; a logical channel identifier; a carrier aggregation duplication indicator; a dual connectivity duplication indicator; an initial number of copies; an activation timer; a deactivation timer; a measurement window length for the packet duplication protocol; a copy determination threshold value for determining the number of copies; a logical path selection threshold value for selection of the logical path; a carrier aggregation determination threshold value for determining an activation of carrier aggregation duplication; a dual connectivity determination threshold value for determining an activation of dual connectivity duplication; a carrier aggregation determination threshold value for determining a deactivation of carrier aggregation duplication; and/or a dual connectivity determination threshold value for determining a deactivation of dual connectivity duplication.

At operation 544, the UE 502C may increment a number of copies for PDCP duplication by 1 or activate an extra CA duplication or an extra DC duplication until the current number of copies meets the reliability requirement of a DRB during the measurement window or until the number of copies or used legs reach the maximum value configured to the UE from the NW. In certain embodiments, PDCP duplication may be performed similar to techniques discussed in connection with the first exemplary issue, as discussed above. Also, in various embodiments, the UE may perform a measurement and determination to determine the reliability requirement of a DRB during the measurement window.

At operation 546, the UE 502C may send a buffer state report (BSR) MAC CE to the BS 504C. As noted above, this may be implemented, for example, in optional embodiments where a NW is configured with a CU/DU split where a DU can derive the duplication state information via the BSR MAC CE.

Figure 5D:
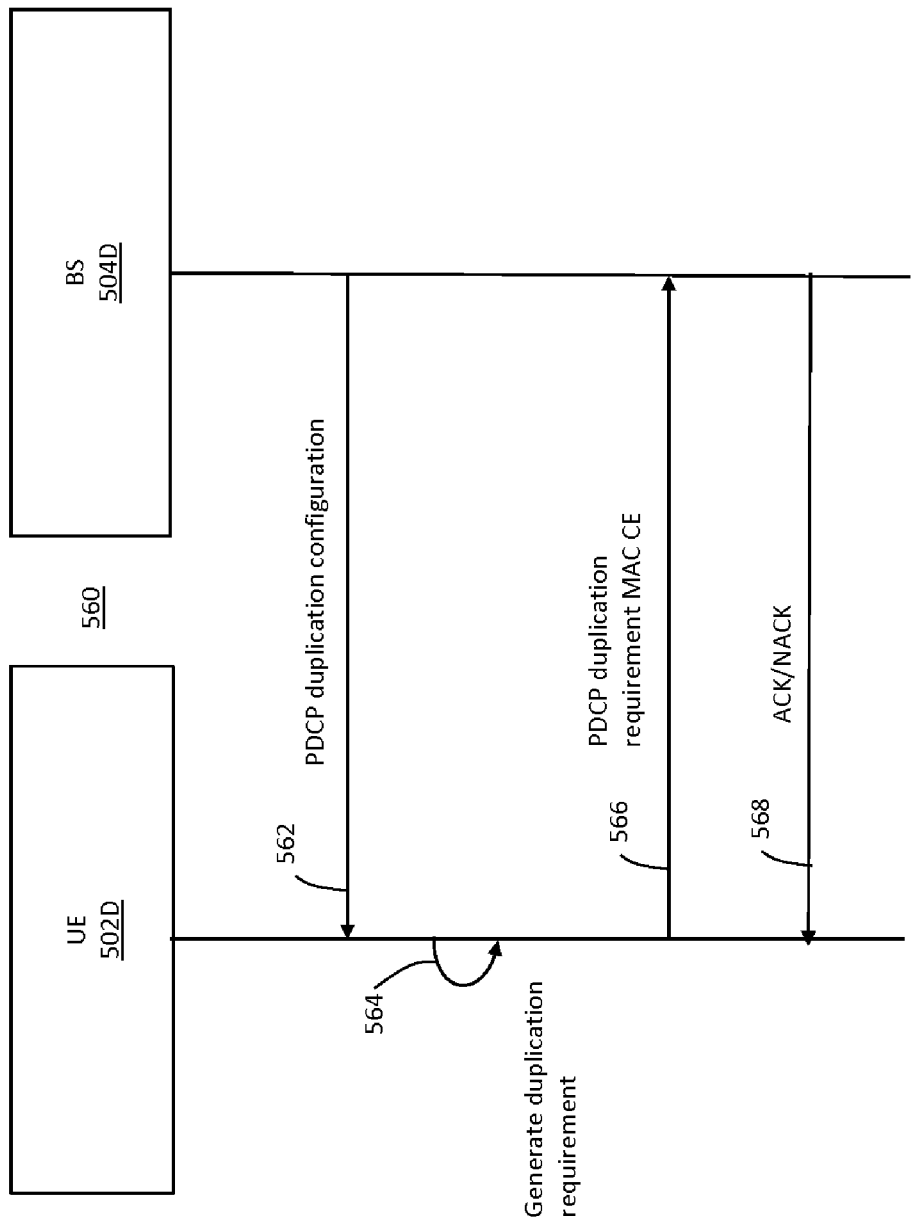
FIG. 5D is a sequence diagram illustrating a process where a number of copies (e.g., for PDCP duplication) is configured in a UE and BS based solution, in accordance with some embodiments.

FIG. 5D is a sequence diagram illustrating a process 560 where a number of copies (e.g., for PDCP duplication) is configured in a UE and BS based solution, in accordance with some embodiments. The process 560 may provide a solution to, for example, the third exemplary issue, discussed above. The process 560 may be performed by a UE 502D and a BS 504D (e.g., a NW). It is noted that the process 560 is merely an example, and is not intended to limit the present disclosure. Accordingly, it is understood that additional operations (e.g., blocks) may be provided before, during, and after the process 560 of FIG. 5D, certain operations may be omitted, certain operations may be performed concurrently with other operations, and that some other operations may only be briefly described herein.

At operation 562, the UE 502D may receive a PDCP duplication configuration (e.g., configuration information) from the BS 504D (e.g., the NW side). This PDCP duplication configuration (e.g., configuration information) may include, for example, any of: a minimum number of copies per data radio bearer; a maximum number of copies; a cell group identifier; a serving cell identifier; a logical channel identifier; a carrier aggregation duplication indicator; a dual connectivity duplication indicator; an initial number of copies; an activation timer; a deactivation timer; a measurement window length for the packet duplication protocol; a copy determination threshold value for determining the number of copies; a logical path selection threshold value for selection of the logical path; a carrier aggregation determination threshold value for determining an activation of carrier aggregation duplication; a dual connectivity determination threshold value for determining an activation of dual connectivity duplication; a carrier aggregation determination threshold value for determining a deactivation of carrier aggregation duplication; and/or a dual connectivity determination threshold value for determining a deactivation of dual connectivity duplication.

At operation 564, the UE 502D may determine that the current number of copies does not meet the reliability requirement of a DRB during the measurement window. Accordingly, the UE may determine to send the activation of extra duplication requirement (e.g., increase the number of copies for PDCP duplication) to meet the reliability requirement. In various embodiments, the UE may perform a measurement and determination to determine the reliability requirement of a DRB during the measurement window.

At operation 566, the UE 502D may transmit the PDCP duplication requirement in a MAC CE to the BS 504D.

At operation 568, the BS 504D may transmit a ACK to the UE 502D to approve the UE 502D producing the number of copies for PDCP duplication to meet the reliability requirement. Alternatively, at operation 568, the BS 504D may transmit a NACK to disapprove the UE 502D producing the number of copies for PDCP duplication to meet the reliability requirement.

FIG. 6A is a sequence diagram illustrating a process 600 of determining a logical path with a set number of copies (e.g., for PDCP duplication) for radio link control (RLC) entity determination in a UE based solution, in accordance with some embodiments. The process 600 may provide a solution to, for example, the fourth exemplary issue, discussed above. The process 600 may be performed by a UE 602A and a BS 604B (e.g., a NW). It is noted that the process 600 is merely an example, and is not intended to limit the present disclosure. Accordingly, it is understood that additional operations (e.g., blocks) may be provided before, during, and after the process 600 of FIG. 6A, certain operations may be omitted, certain operations may be performed concurrently with other operations, and that some other operations may only be briefly described herein.

At operation 610, a PDCP duplication configuration may be received at the UE 602A from the BS 604A. This PDCP duplication configuration may dictate how multiple RLC entities are configured. For example, this PDCP duplication configuration may include criteria for the selection of RLC entities, including the switch out threshold for PDCP, Lout, and switch in threshold for PDCP, Lin.

At operation 612, the UE 602A may perform selection or reselection of a suitable RLC entity for PDCP duplication copy transmission when any current measurement result of an associated available RLC entity for PDCP duplication is lower than the Lout. Also, the UE 602A may perform selection or reselection of a suitable RLC entity for PDCP duplication copy transmission when the measurement result of any RLC entities not currently used for PDCP duplication copy transmission is greater than the Lin threshold.

At operation 614, the UE 602A may send a buffer state report (BSR) MAC CE to the BS 604A. As noted above, this may be implemented, for example, in embodiments where a NW is configured with a CU/DU split where a DU can derive the duplication state information via the BSR MAC CE. In various embodiments, the BSR MAC CE can be used to notify the BS 604A that a data buffer of a logical channel associated with the selected or reselected RLC entity may be utilized for data transmission.

Figure 6B:
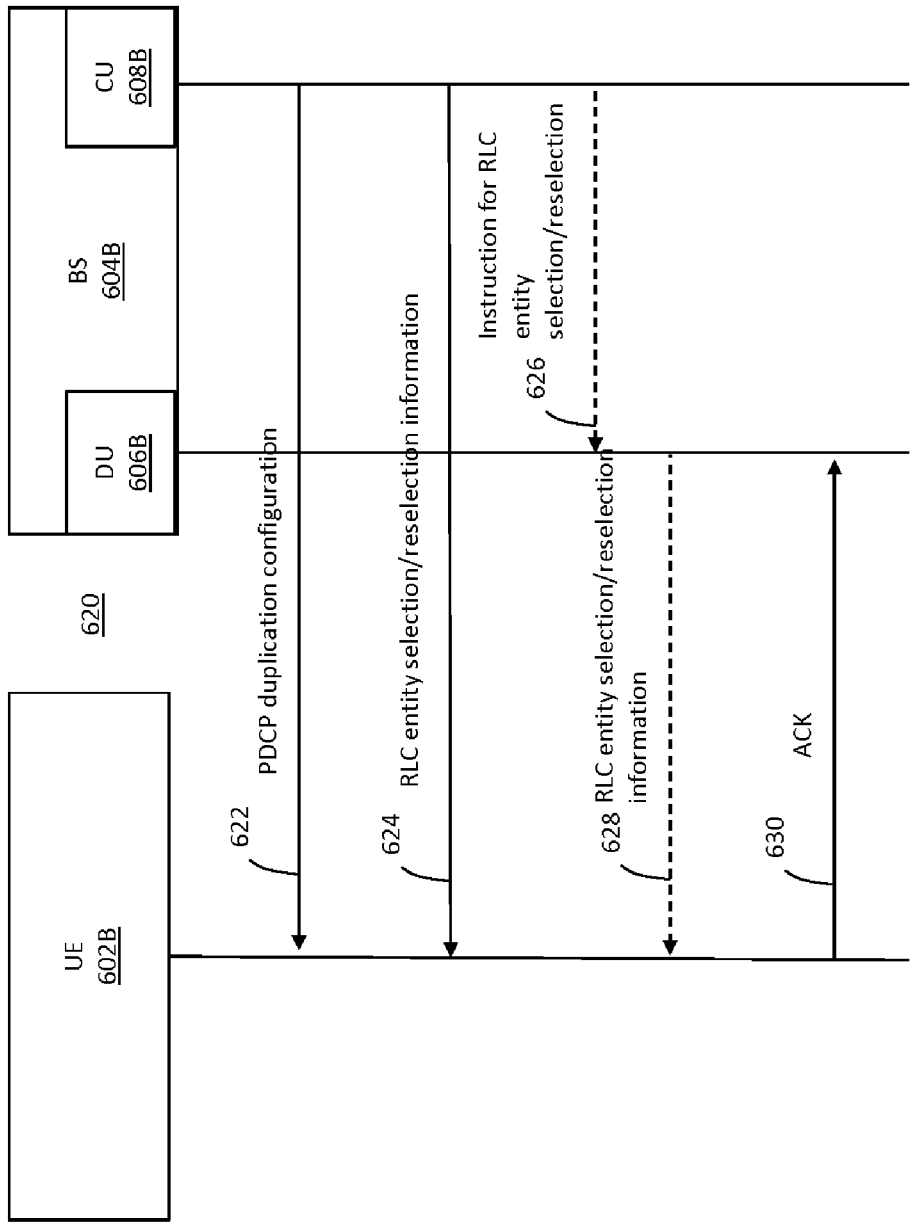
FIG. 6B is a sequence diagram illustrating a process of determining a logical path with a set number of copies (e.g., for PDCP duplication) for RLC entity determination in a network (NW) based solution, in accordance with some embodiments.

FIG. 6B is a sequence diagram illustrating a process 620 of determining a logical path with a set number of copies (e.g., for PDCP duplication) for radio link control (RLC) entity determination in a network (NW) based solution, in accordance with some embodiments. The process 620 may provide a solution to, for example, the fourth exemplary issue, discussed above. The process 620 may be performed by a UE 602B and a BS 604B (e.g., a NW), which may include a DU 606B and a CU 608B (e.g., a DU/CU split) . . . . It is noted that the process 620 is merely an example, and is not intended to limit the present disclosure. Accordingly, it is understood that additional operations (e.g., blocks) may be provided before, during, and after the process 620 of FIG. 6B, certain operations may be omitted, certain operations may be performed concurrently with other operations, and that some other operations may only be briefly described herein.

At operation 622, a PDCP duplication configuration may be received at the UE 602A from the BS 604A. In optional embodiments with a DU/CU split, the PDCP duplication configuration may be received at the UE 602A from the CU 608B.

At operation 624, RLC entity selection/reselection information may be received at the UE 602A from the BS 604A. In various embodiments, the RLC entity selection/reselection information may be determined by the BS 604B based on a measurement report received from the UE 602B or a sounding reference signal (SRS) measurement result. Alternatively, this RLC entity selection/reselection information may be sent in a MAC CE. Also, this RLC entity selection/reselection information may be utilized for configuration or reconfiguration of the current RLC entities for UL transmissions with multiple PDCP PDU copies. In optional embodiments with a DU/CU split, the RLC entity selection/reselection information may be received at the UE 602A from the CU 608B.

Operation 626 and operation 628, noted to be optional with dotted lines, may be performed when there is a CU/DU split as an alternative to operation 624. At operation 626, the CU 608B may instruct the DU 606B on the RLC entity selection/reselection information that may be utilized for configuration or reconfiguration of the current RLC entities for UL transmissions with multiple PDCP PDU copies. At operation 628, the DU 606B may send a MAC CE that includes the RLC entity selection/reselection information to the UE 602B.

At operation 630, the UE may apply the received RLC entity selection/reselection information and send a ACK to confirm receipt and application of the RLC entity selection/reselection information or received MAC CE.

In optional embodiments with a DU/CU split, if the RLC entity selection or reselection procedure is performed by a RLC entity selection/reselection, the DU 606B can then derive the RLC selection (LCH selection) information through a CU notification or BSR MAC CE from the UE 602B. The RLC selection information may include the LCH ID. This LCH ID may be indicative of an activated duplication transmission or deactivated duplication transmission, a CG ID, or a LCH sub-set.

Figure 6C:
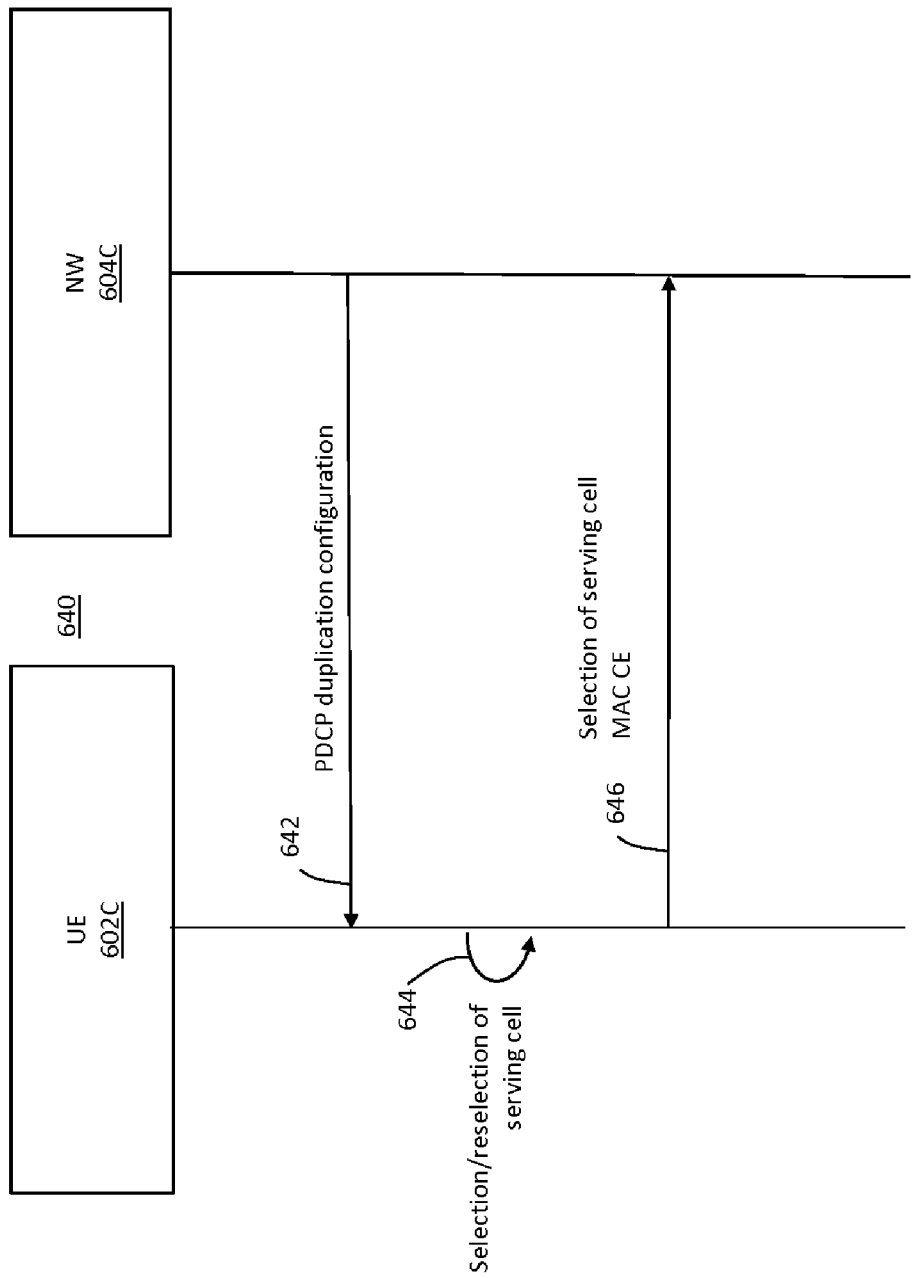
FIG. 6C is a sequence diagram illustrating a process of determining a logical path with a set number of copies (e.g., for PDCP duplication) for cell (e.g. serving cell) determination in a UE based solution, in accordance with some embodiments.

FIG. 6C is a sequence diagram illustrating a process 640 of determining a logical path with a set number of copies (e.g., for PDCP duplication) for cell (e.g. serving cell) determination in a UE based solution, in accordance with some embodiments. The process 640 may provide a solution to, for example, the fourth exemplary issue, discussed above. The process 640 may be performed by a UE 602A and a BS 604B (e.g., a NW). It is noted that the process 640 is merely an example, and is not intended to limit the present disclosure. Accordingly, it is understood that additional operations (e.g., blocks) may be provided before, during, and after the process 640 of FIG. 6C, certain operations may be omitted, certain operations may be performed concurrently with other operations, and that some other operations may only be briefly described herein.

At operation 642, a PDCP duplication configuration may be received at the UE 602A from the BS 604A. This PDCP duplication configuration may identify the serving cell(s) that are configured for each LCH through a RRC message. For example, this PDCP duplication configuration may include criteria for the selection of the serving cell(s), including the switch out threshold for PDCP duplication copies transmission, Lout, and switch in threshold for PDCP duplication copies transmission, Lin.

At operation 644, the UE 602A may perform selection or reselection of a serving cell (e.g., a restricted serving cell) for each copy of PDCP duplication when any current measurement result of a currently associated serving cell for each copy of PDCP duplication is lower than the Lout. Also, the UE 602A may perform selection or reselection of a serving cell (e.g., a restricted serving cell) for each LCH for PDCP duplication when the measurement result of any serving cells not currently used for PDCP duplication copy transmission is greater than the Lin threshold.

At operation 646, the UE 602A may generate and send a MAC CE to notify the BS 604C of the serving cells (e.g., as determined after processing in operation 612) associated with each transmission copy for PDCP duplication. Then, the UE 602A may transmit PDCP PDUs through the selected serving cells (e.g., as determined after processing in operation 612). Stated another way, the UE 602A may utilize the logical path determined in operation 612 for communications.

Figure 6D:
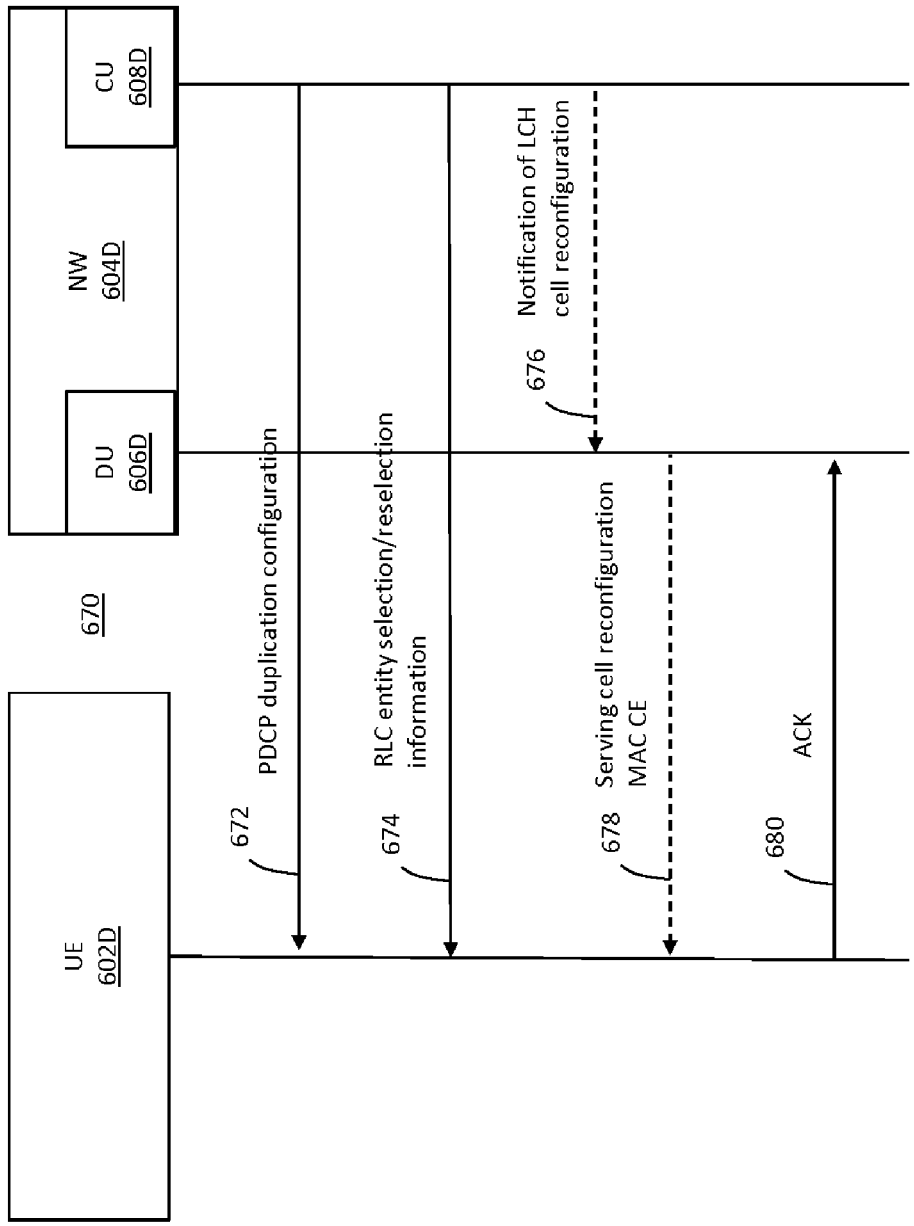
FIG. 6D is a sequence diagram illustrating a process of determining a logical path with a set number of copies (e.g., for PDCP duplication) for serving cell determination in a NW based solution, in accordance with some embodiments.

FIG. 6D is a sequence diagram illustrating a process 670 of determining a logical path with a set number of copies (e.g., for PDCP duplication) for serving cell determination in a network (NW) based solution, in accordance with some embodiments. The process 670 may provide a solution to, for example, the fourth exemplary issue, discussed above. The process 670 may be performed by a UE 602D and a BS 604D (e.g., a NW), which may include a DU 606D and a CU 608D (e.g., a DU/CU split) . . . . It is noted that the process 670 is merely an example, and is not intended to limit the present disclosure. Accordingly, it is understood that additional operations (e.g., blocks) may be provided before, during, and after the process 670 of FIG. 6D, certain operations may be omitted, certain operations may be performed concurrently with other operations, and that some other operations may only be briefly described herein.

At operation 672, a PDCP duplication configuration may be received at the UE 602D from the BS 604D. In optional embodiments with a DU/CU split, the PDCP duplication configuration may be received at the UE 602D from the CU 608B.

At operation 674, RLC entity selection/reselection information may be received at the UE 302A from the BS 304A. In various embodiments, the RLC entity selection/reselection information may be determined by the BS 604B based on a measurement report received from the UE 602B or a sounding reference signal (SRS) measurement result. This RLC entity selection/reselection information may be sent in a MAC CE. Also, this RLC entity selection/reselection information may be utilized for configuration or reconfiguration of the serving cells (e.g., current or restricted serving cells) associated with each copy as in the PDCP duplication case (e.g., as used for UL transmissions with multiple PDCP PDU copies). In optional embodiments with a DU/CU split, the RLC entity selection/reselection information may be received at the UE 302A from the CU 608B.

Operation 676 and operation 678, noted to be optional with dotted lines, may be performed when there is a CU/DU split as an alternative to operation 674. At operation 676, the CU 608D may instruct the DU 606D on the RLC entity selection/reselection information that may be utilized for configuration or reconfiguration of the LCH to cell mapping relationships. These LCH to cell mapping relationships may dictate the serving cells (e.g., current or restricted serving cells) associated with each LCH as used for PDCP duplication (e.g., as used for UL transmissions with multiple PDCP PDU copies). At operation 678, the DU 606D may send a MAC CE that includes the serving cell selection/reselection for each copy transmission to the UE 602D.

At operation 680, the UE 602D may apply the received RLC entity selection/reselection information and/or the MAC CE that includes the serving cell selection/reselection for each copy transmission. The UE 602D may then send a ACK to confirm receipt and application of the RLC entity selection/reselection information and/or the MAC CE that includes the LCH to cell mapping relationships In optional embodiments with a DU/CU split, the DU 606D may determine the configuration or reconfiguration of the serving cells (e.g., current or restricted serving cells) associated with each LCH as used for PDCP duplication (e.g., as used for UL transmissions with multiple PDCP PDU copies) through a CU notification or BSR MAC CE from the UE 602B. In certain embodiments, the configuration or reconfiguration of the serving cells (e.g., current or restricted serving cells) associated with each LCH as used for PDCP duplication (e.g., as used for UL transmissions with multiple PDCP PDU copies) may be indicated by a serving cell ID (which is activated for duplication transmission), the LCH ID and/or the CG ID.

Figure 7A:
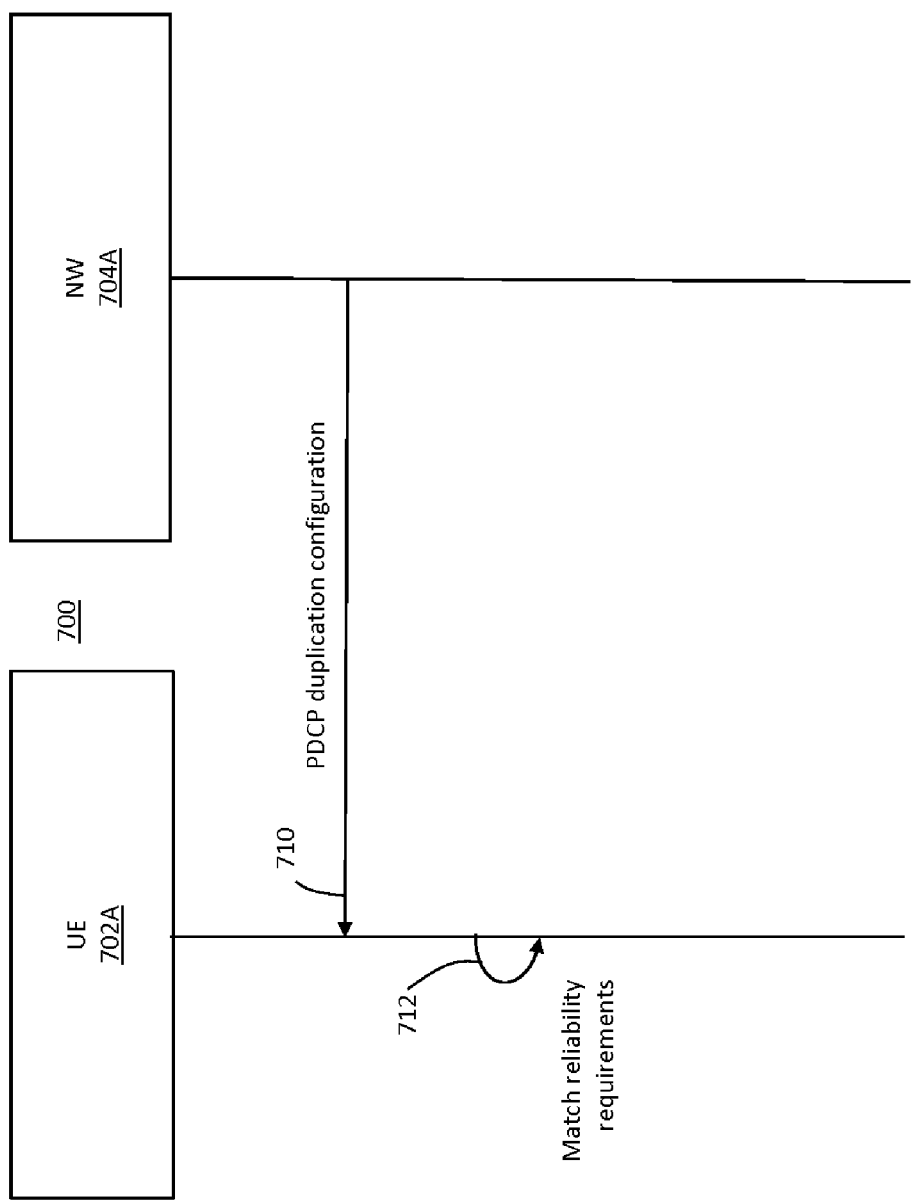
FIG. 7A is a sequence diagram illustrating a process of UE behavior when a current UL transmission does not match a reliability requirement, in accordance with some embodiments.

FIG. 7A is a sequence diagram illustrating a process 700 of UE behavior when a current UL transmission does not match a reliability requirement, in accordance with some embodiments. The process 700 may provide a solution to, for example, the fifth exemplary issue, discussed above. The process 700 may be performed by a UE 702A and a BS 704A (e.g., a NW). It is noted that the process 700 is merely an example, and is not intended to limit the present disclosure. Accordingly, it is understood that additional operations (e.g., blocks) may be provided before, during, and after the process 700 of FIG. 7A, certain operations may be omitted, certain operations may be performed concurrently with other operations, and that some other operations may only be briefly described herein.

At operation 710, the UE 702A may receive a PDCP duplication configuration from the BS (e.g., the NW side). This PDCP duplication configuration may include at least one of the following: a minimum number of copies 'n', a maximum number of copies 'm', the initial PDCP duplication state (which may include: a cell group ID, a logical channel ID, a CA/DC duplication indicator, and an initial number of copies 'x'), a measurement window, or the threshold value for measurement results when the PDCP entity is established or re-established.

At operation 712, the UE 702A may perform measurements of a serving cell in order to determine a reliability (e.g., reliability of a DRB during a measurement window) of a logical path and/or a part of a logical path (e.g., a PDCP entity, RLC entity, MAC entity, and/or serving cell). The UE may perform selection and/or reselection toward a logical path and/or part of a logical path that can satisfy a reliability requirement (e.g., a reliability requirement of a DRB during the measurement window) if the corresponding logical path and/or a part of a logical path does not satisfy the reliability requirement. However, if there is no logical path and/or part of a logical path that can satisfy the reliability requirement, the UE may then increment a number of copies for PDCP duplication by 1 or activate an extra CA duplication or an extra DC duplication until the current number of copies meets the reliability requirement of a DRB during the measurement window or until the current number of copies and the logical path reach the maximum value configured by the NW. Also, in various embodiments, the UE may perform a measurement and determination to determine the reliability requirement of a DRB during the measurement window.

Figure 7B:
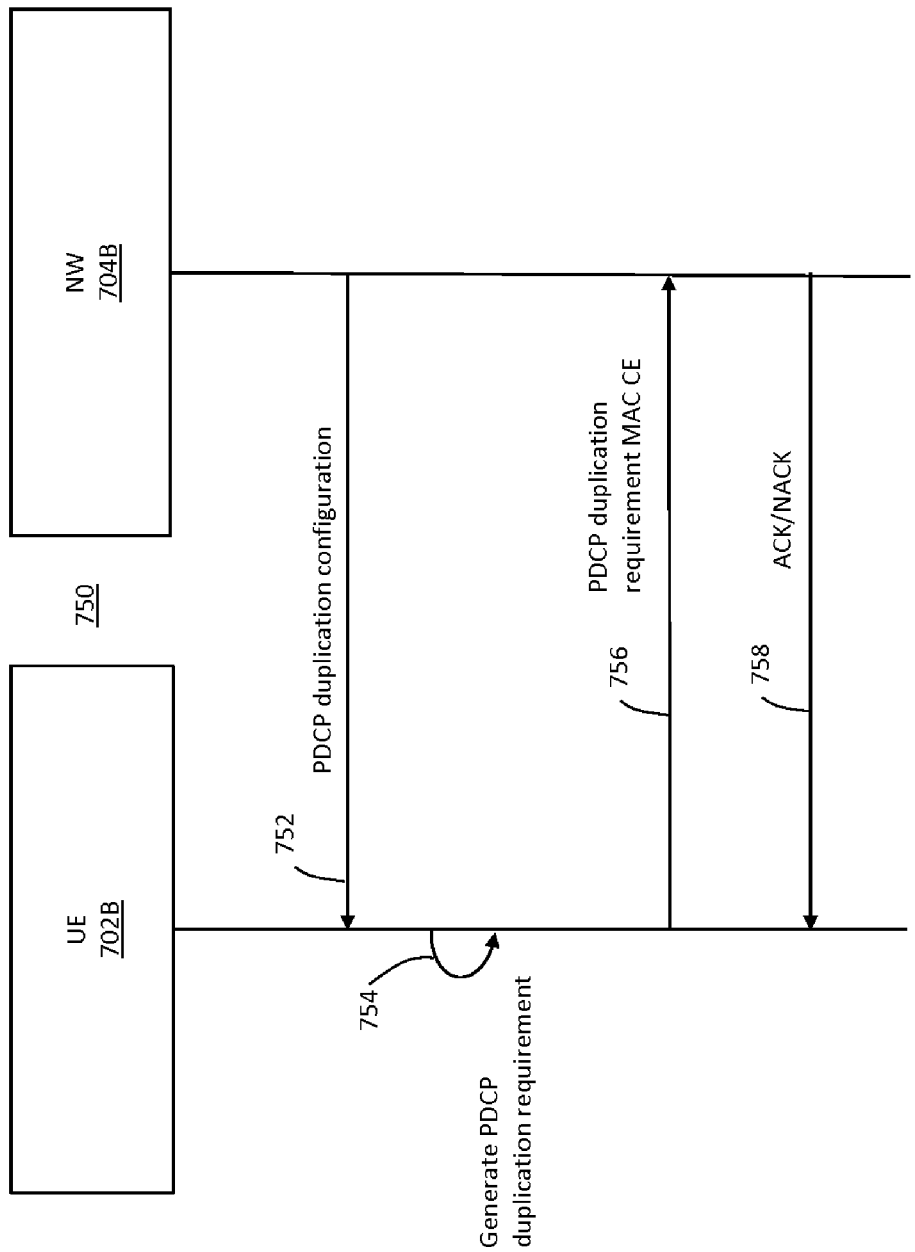
FIG. 7B is a sequence diagram illustrating a process of UE and BS behavior when a current UL transmission does not match a reliability requirement, in accordance with some embodiments.

FIG. 7B is a sequence diagram illustrating a process 750 of UE and BS behavior when a current UL transmission does not match a reliability requirement, in accordance with some embodiments. The process 750 may provide a solution to, for example, the fifth exemplary issue, discussed above. The process 750 may be performed by a UE 702B and a BS 704B (e.g., a NW). It is noted that the process 750 is merely an example, and is not intended to limit the present disclosure. Accordingly, it is understood that additional operations (e.g., blocks) may be provided before, during, and after the process 750 of FIG. 7B, certain operations may be omitted, certain operations may be performed concurrently with other operations, and that some other operations may only be briefly described herein.

At operation 752, the UE 702B may receive a PDCP duplication configuration from the BS 704B (e.g., the NW side). This PDCP duplication configuration may include a minimum number of copies 'n', a maximum number of copies 'm', the initial PDCP duplication state (which may include: a cell group ID, a logical channel ID, a CA/DC duplication indicator, an initial number of copies 'x'), a measurement window, or the threshold value for measurement results when the PDCP entity is established or re-established.

At operation 754, the UE 702B may perform measurements of a serving cell in order to determine a reliability (e.g., reliability of a DRB during a measurement window) of a logical path and/or a part of a logical path (e.g., a PDCP entity, RLC entity, MAC entity, and/or serving cell). The UE may perform selection and/or reselection toward a logical path and/or part of a logical path that can satisfy a reliability requirement (e.g., a reliability requirement of a DRB during the measurement window) if the corresponding logical path and/or a part of a logical path does not satisfy the reliability requirement.

However, if there is no logical path and/or part of a logical path that can satisfy the reliability requirement, the UE may determine the duplication requirement (e.g., number of copies for PDCP duplication) to meet the reliability requirement. In various embodiments, the UE may perform a measurement and determination to determine the reliability requirement of a DRB during the measurement window.

At operation 756, the UE 702D may transmit the PDCP duplication requirement in a MAC CE to the BS 504D.

At operation 758, the BS 704D may transmit a ACK to the UE 702D to approve the UE 702D producing the number of copies for PDCP duplication to meet the reliability requirement. Alternatively, at operation 568, the BS 704D a NACK to disapprove the UE 702D producing the number of copies for PDCP duplication to meet the reliability requirement.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element or embodiment herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, one or more of the functions described in this document may be performed by means of computer program code that is stored in a "computer program product", "computer-readable medium", and the like, which is used herein to generally refer to media such as, memory storage devices, or storage unit. These, and other forms of computer-readable media, may be involved in storing one or more instructions for use by processor to cause the processor to perform specified operations. Such instructions, generally referred to as "computer program code" (which may be grouped in the form of computer programs or other groupings), which when executed, enable the computing system to perform the desired operations.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method performed by a communication device, comprising:
   receiving, by the communication device, packet data convergence protocol (PDCP) duplication configuration information from a communication node;
   determining, by the communication device, for a packet duplication protocol per data radio bearer, a number of logical paths based on the PDCP configuration information,
   wherein more than two radio link control (RLC) entities are associated with a PDCP entity of the communication device;
   wherein the PDCP duplication configuration information indicates an identification of an RLC entity; and
   transmitting, by the communication device in response to PDCP duplication being deactivated, a PDCP data packet data unit (PDU) either to a first primary path or to a second primary path if a total data volume for both the PDCP entity and the RLC entities is equal to or larger than a configured threshold ULdataThreshold,
   wherein the first primary path is configured in a master node (MN) and the second primary path is configured in a secondary node (SN).

2. The method of claim 1, wherein:
   the PDCP duplication configuration information is received from the communication node with a medium access control (MAC) control element or a radio resource control (RRC) message.

3. The method of claim 1, wherein the identification of an RLC entity comprises a logical channel identifier (LCH ID).

4. The method of claim 1, wherein the identification of an RLC entity indicates a related RLC entity identity for which PDCP duplication is activated.

5. The method of claim 1, wherein the PDCP duplication configuration information further indicates an activation or deactivation indicator.

6. A method performed by a communication node, comprising:
   transmitting, by the communication node, packet data convergence protocol (PDCP) duplication configuration information to a communication device, to enable the communication device to determine for a packet duplication protocol per data radio bearer, a number logical paths based on the PDCP duplication configuration information,
   wherein more than two radio link control (RLC) entities are associated with a PDCP entity of the communication device,
   wherein the PDCP duplication configuration information indicates an identification of an RLC entity; and
   receiving, by the communication node in response to PDCP duplication being deactivated, a PDCP data packet data unit (PDU) either to a first primary path or to a second primary path if a total data volume for both the PDCP entity and the RLC entities is equal to or larger than a configured threshold ULdataThreshold,
   wherein the first primary path is configured in a master node (MN) and the second primary path is configured in a secondary node (SN).

7. The method of claim 6, comprising:
   transmitting, by the communication node, the PDCP duplication configuration information with a medium access control (MAC) control element or an radio resource control (RRC) message.

8. The method of claim 6, wherein the identification of an RLC entity comprises a logical channel identifier (LCH ID).

9. The method of claim 6, wherein the identification of an RLC entity indicates a related RLC entity identity for which PDCP duplication is activated.

10. The method of claim 6, wherein the PDCP duplication configuration information further indicates an activation or deactivation indicator.

11. The method of claim 6, further comprising:
in response to the communication node comprises a centralized unit and a distributed unit:
transmitting, by the centralized unit, the PDCP configuration information to the distributed unit; and
transmitting, by the distributed unit, the PDCP configuration information to the communication device via the medium access control (MAC) control element.

12. A communication device, comprising a processor configured to:
receive, via a receiver, packet data convergence protocol (PDCP) duplication configuration information from a communication node;
determine, for a packet duplication protocol per data radio bearer, a number of logical paths based on the PDCP configuration information,
wherein more than two radio link control (RLC) entities are associated with a PDCP entity of the communication device,
wherein the PDCP duplication configuration information indicates an identification of an RLC entity; and
transmit, via a transmitter in response to PDCP duplication being deactivated, a PDCP data packet data unit (PDU) either to a first primary path or to a second primary path if a total data volume for both the PDCP entity and the RLC entities is equal to or larger than a configured threshold ULdataThreshold,
wherein the first primary path is configured in a master node (MN) and the second primary path is configured in a secondary node (SN).

13. The communication device of claim 12, wherein:
the PDCP duplication configuration information is received from the communication node with a medium access control (MAC) control element or a radio resource control (RRC) message.

14. The communication device of claim 12, wherein the identification of an RLC entity comprises a logical channel identifier (LCH ID).

15. The communication device of claim 12, wherein the identification of an RLC entity indicates a related RLC entity identity for which PDCP duplication is activated.

16. The communication device of claim 12, wherein the PDCP duplication configuration information further indicates an activation or deactivation indicator.

17. A communication node, comprising a processor configured to:
transmit, via a transmitter, packet data convergence protocol (PDCP) duplication configuration information to a communication device, to enable the communication device to determine for a packet duplication protocol per data radio bearer, a number logical paths based on the PDCP duplication configuration information,
wherein more than two radio link control (RLC) entities are associated with a PDCP entity of the communication device,
wherein the PDCP duplication configuration information indicates an identification of an RLC entity; and
receive, via a receiver in response to PDCP duplication being deactivated, a PDCP data packet data unit (PDU) either to a first primary path or to a second primary path if a total data volume for both the PDCP entity and the radio link control (RLC) entities is equal to or larger than a configured threshold ULdataThreshold,
wherein the first primary path is configured in a master node (MN) and the second primary path is configured in a secondary node (SN).

18. The communication node of claim 17, wherein:
the processor is further configured to transmit, via the transmitter, the PDCP duplication configuration information with a medium access control (MAC) control element or an radio resource control (RRC) message.

19. The communication node of claim 17, wherein the identification of an RLC entity comprises a logical channel identifier (LCH ID).

20. The communication node of claim 17, wherein the identification of an RLC entity indicates a related RLC entity identity for which PDCP duplication is activated.

21. The communication node of claim 17, wherein the PDCP duplication configuration information further indicates an activation or deactivation indicator.

22. The communication node of claim 17, wherein:
in response to the communication node comprises a centralized unit and a distributed unit:
transmit, by the centralized unit, the PDCP configuration information to the distributed unit; and
transmit, by the distributed unit, the PDCP configuration information to the communication device via the medium access control (MAC) control element.

* * * * *